United States Patent
Kimmig et al.

[11] Patent Number: 6,085,882
[45] Date of Patent: Jul. 11, 2000

[54] FRICTION CLUTCH

[75] Inventors: Karl-Ludwig Kimmig, Ottenhöfen; Ingo Schulz, Bühl-Vimbuch, both of Germany; Martin O'Mahony, Sheffield, United Kingdom

[73] Assignee: LuK Lamellen und Kupplungsbau GmbH, Buhl, Germany

[21] Appl. No.: 09/208,161

[22] Filed: Dec. 9, 1998

[30] Foreign Application Priority Data

Dec. 9, 1997 [DE] Germany .............. 197 54 537
Mar. 19, 1998 [DE] Germany .............. 198 11 936

[51] Int. Cl.⁷ .............. F16D 13/50; F16D 3/06
[52] U.S. Cl. .............. 192/70.18; 192/70.25; 192/70.28; 192/89.23; 192/89.25; 192/109 A
[58] Field of Search .............. 192/70.18, 70.28, 192/70.25, 70.27, 89.23, 89.25, 52.6, 109 A

[56] References Cited

U.S. PATENT DOCUMENTS

| | | | |
|---|---|---|---|
| 3,450,241 | 6/1969 | Kuno | 192/70.18 |
| 3,695,404 | 10/1972 | Maucher et al. | 192/70.18 |
| 4,714,148 | 12/1987 | Alas et al. | 192/52.6 X |
| 5,409,091 | 4/1995 | Reik et al. | |
| 5,450,934 | 9/1995 | Maucher | |
| 5,586,633 | 12/1996 | Mizukami et al. | 192/70.25 |
| 5,588,517 | 12/1996 | Kooy et al. | |
| 5,628,389 | 5/1997 | Wittmann et al. | |
| 5,632,365 | 5/1997 | Maucher | |
| 5,634,541 | 6/1997 | Maucher | |
| 5,803,224 | 9/1998 | Kimmig et al. | 192/70.25 |
| 5,862,901 | 1/1999 | Weiss et al. | 192/70.25 |
| 5,873,442 | 2/1999 | Uehara | 192/70.25 |
| 5,894,916 | 4/1999 | Grupp et al. | 192/70.25 |

*Primary Examiner*—Rodney H. Bonck
*Attorney, Agent, or Firm*—Darby & Darby

[57] ABSTRACT

A friction clutch wherein the clutch spring is shiftable axially toward the pressure plate during disengagement of the clutch to compensate for wear at least upon the friction linings of the clutch disc. Disengagement of the clutch is facilitated by several springs which act upon the clutch spring and upon the pressure plate and render it possible to disengage the clutch in response to the application of a relatively small force to the tips of the radially inwardly extending prongs of the clutch spring. Moreover, the magnitude of the disengaging force remains at least substantially constant during the entire useful life of the clutch.

39 Claims, 8 Drawing Sheets

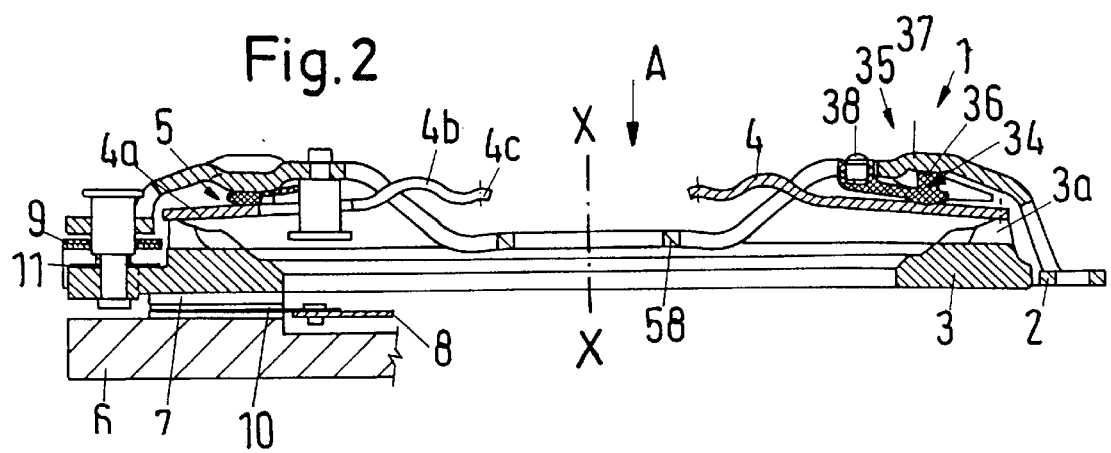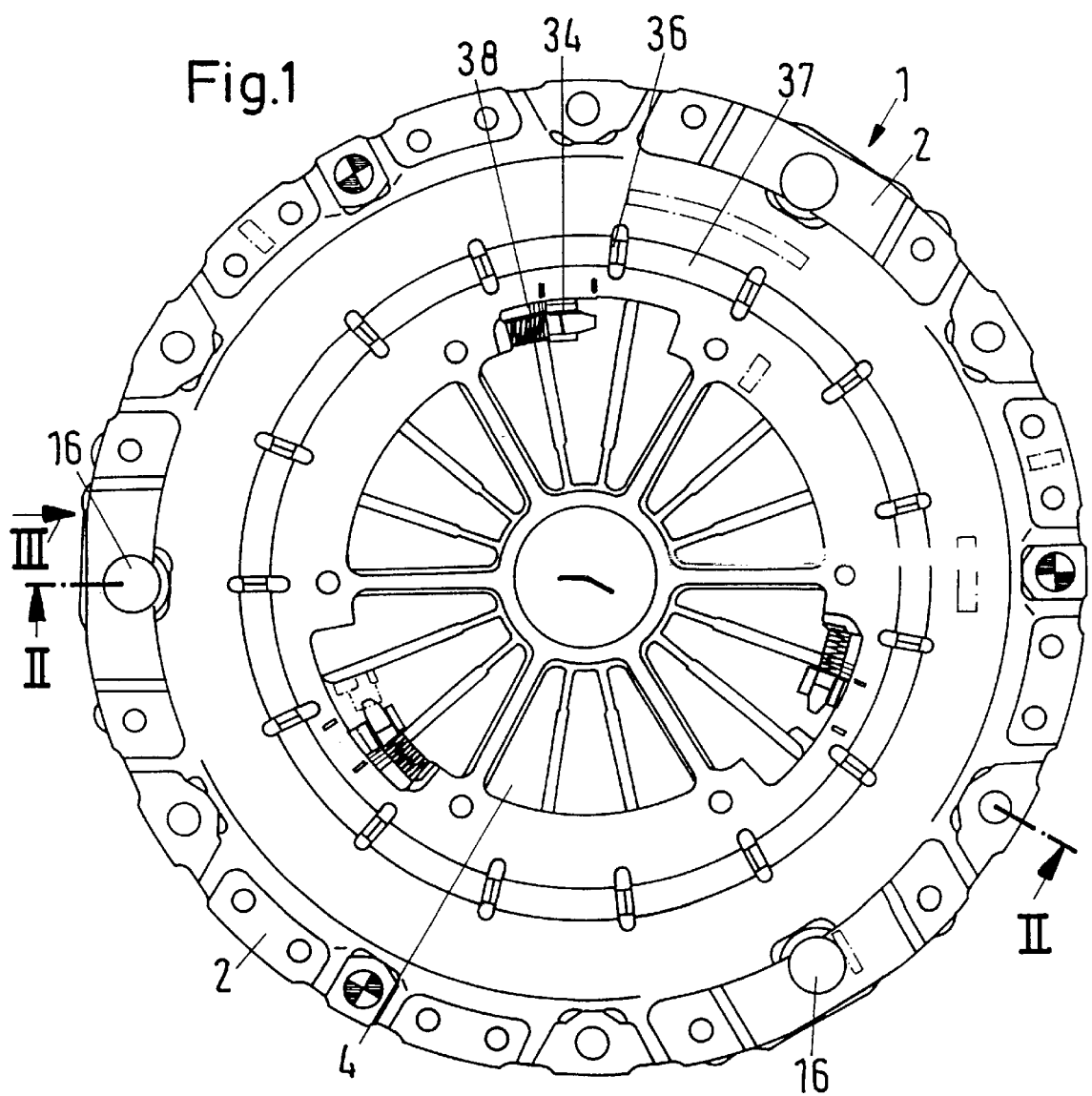

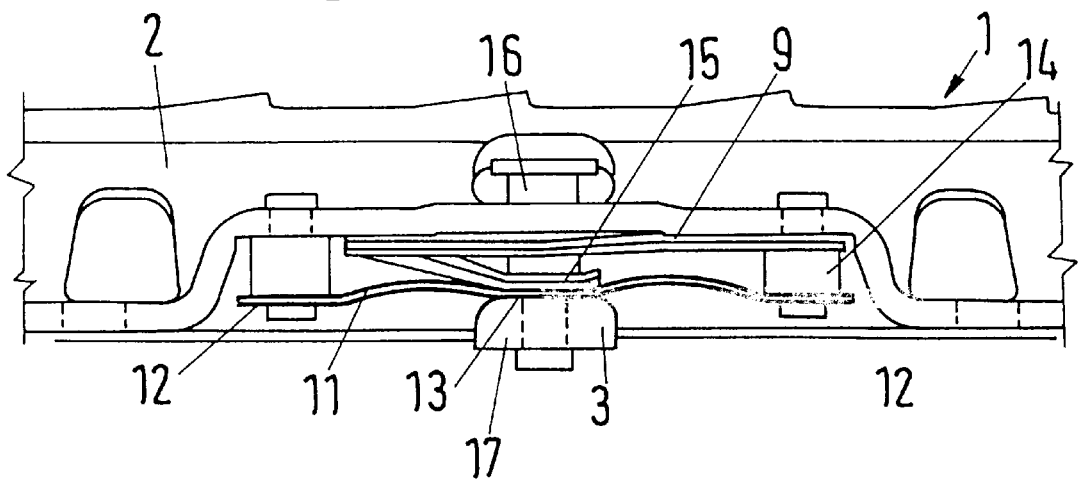
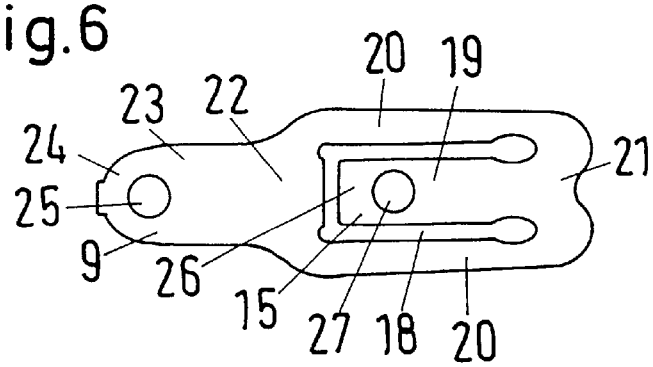
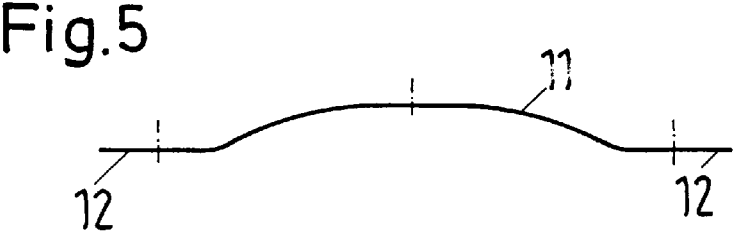
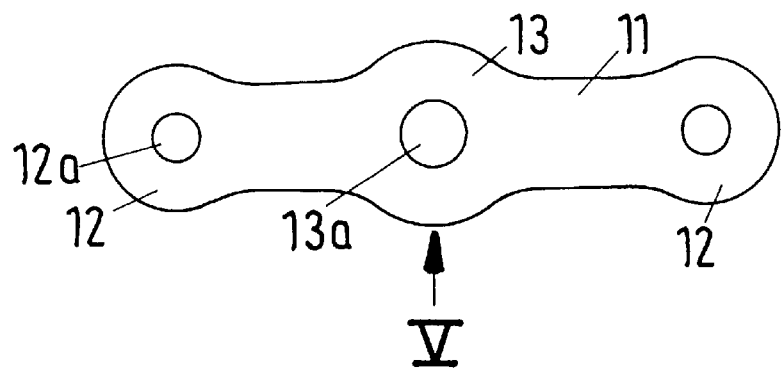

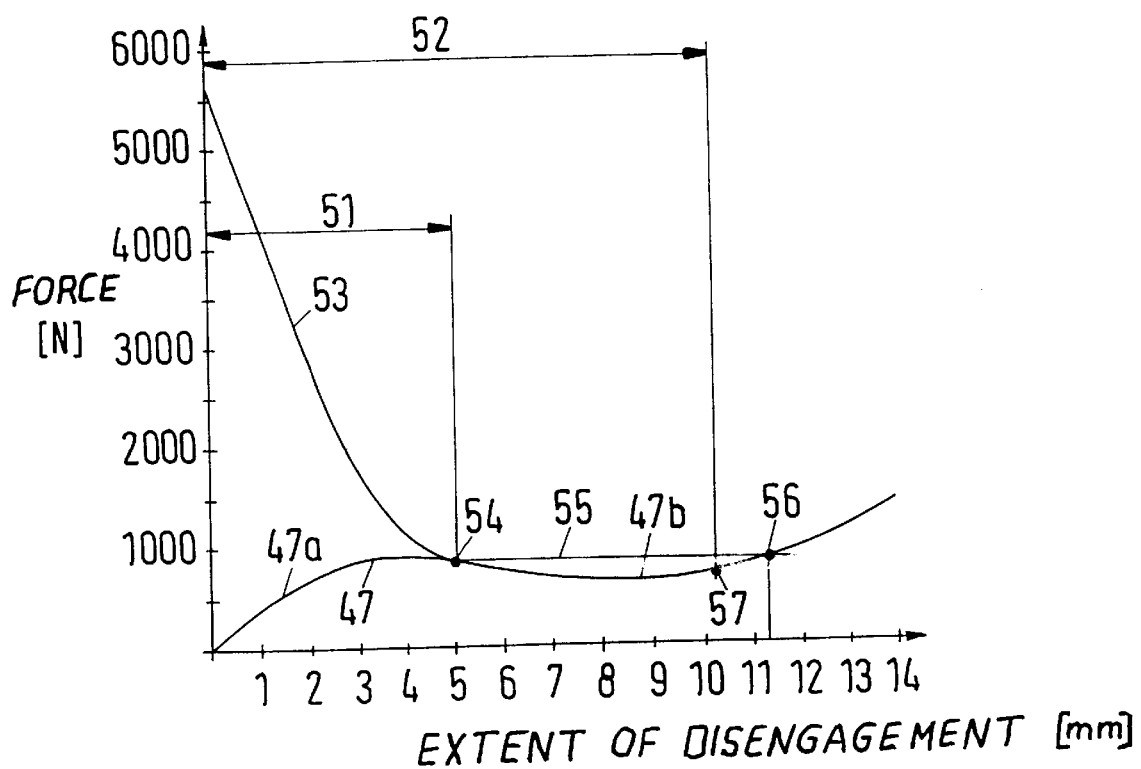

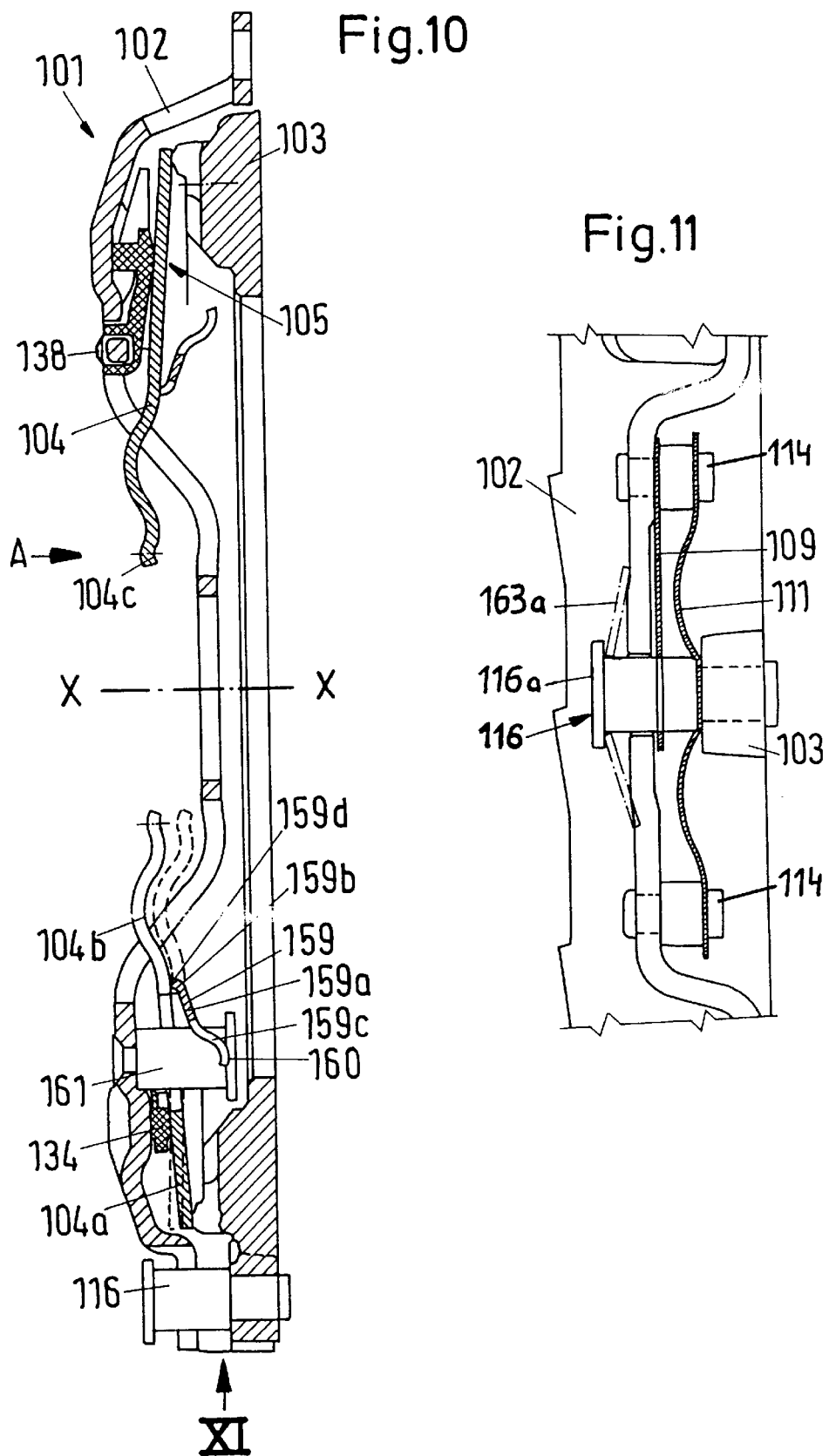

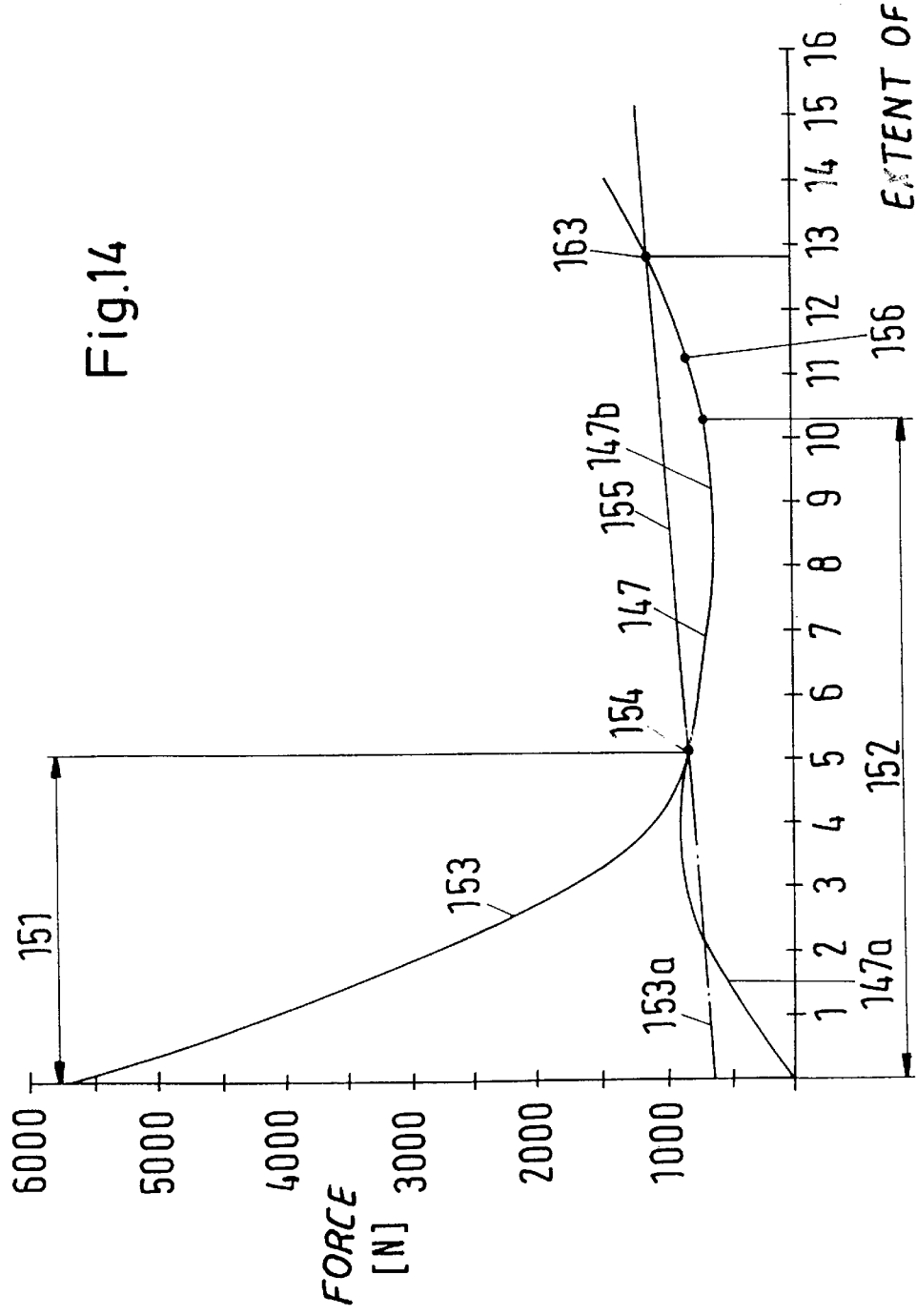

# FRICTION CLUTCH

BACKGROUND OF THE INVENTION

The invention relates to torque transmitting systems in general, and more particularly to improvements in friction clutches of the type normally employed in the power trains of motor vehicles, for example, to transmit torque between the rotary output element (such as a camshaft or a crankshaft) of a prime mover (such as an internal combustion engine) and the rotary input element of a manually shiftable, automated or automatic change-speed transmission. Still more particularly, the invention relates to improvements in friction clutches of the type embodying a unit or assembly which compensates for wear upon certain constituents (particularly the friction linings of the clutch plate or clutch disc), namely for wear which is attributable to or is a consequence of repeated engagement and disengagement of the clutch during extended periods of time, particularly during the entire useful life of the clutch.

Friction clutches of the above outlined character are disclosed, for example, in published German patent applications Ser. Nos. 42 39 291 (corresponding to U.S. Pat. No. 5,450,934 granted Aug. 19, 1995), 43 06 505 (corresponding to U.S. Pat. No. 5,634,541 granted Jun. 03, 1997), 42 39 289 (corresponding to U.S. Pat. No. 5,450,934 granted Sep. 19, 1995), 43 22 677 (corresponding to U.S. patent application Ser. No. 08/211,020 filed Jan. 6, 1995), 44 18 026 (corresponding to U.S. patent application Ser. No. 08/250, 760 filed May 28, 1994), 44 31 642 (corresponding to U.S. Pat. No. 5,588,517 granted Sep. 13, 1994) and 195 10 905 (corresponding to U.S. Pat. No. 5,632,365 granted May 27, 1997). The disclosures of all patents and patent applications which are identified in the specification of the present application are incorporated herein by reference.

As a rule, a friction clutch of the character under consideration in the specification and in the claims of the present application comprises a rotary housing or cover, a pressure plate which is rotatable with and has limited freedom of axial movement relative to the housing, and at least one clutch spring (normally a diaphragm spring and hereinafter referred to as diaphragm spring) which serves to urge the pressure plate axially and away from the housing for the purpose of engaging the friction clutch. The purpose of the aforementioned compensating unit is to compensate for wear at least upon the friction linings which form part of the clutch disc and are clamped between the pressure plate and an engine-driven counterpressure plate (such as a flywheel) when the clutch is at least partially engaged. More specifically, the compensating unit ensures that the bias of the diaphragm spring upon the pressure plate in the engaged condition of the friction clutch remains at least substantially constant during the useful life of the clutch (i.e., regardless of the extent of wear upon the friction linings and preferably upon the friction surfaces of the pressure plate and counterpressure plate, as well as upon certain additional constituents (such as various springs) which are subject to wear in response to repeated engagement and disengagement during the useful life of the friction clutch)

OBJECTS OF THE INVENTION

An object of the invention is to simplify the manufacture and to thus reduce the cost of several constituents of as well as of the entire friction clutch of the above outlined character.

Another object of the invention is to provide a compact friction clutch which can be utilized as a superior substitute for conventional friction clutches, particularly in the power trains of motor vehicles.

A further object of the invention is to provide a friction clutch which can stand long periods of repeated use without any changes, or without appreciable changes, in the predictability of transmission of selected torques.

An additional object of the invention is to provide a friction clutch which is constructed, designed and assembled and which can be operated in such a way that the magnitude of the force which is required to be applied during disengagement of the clutch varies very little or not at all and remains relatively small during the entire useful life of the clutch and/or of the power train in which the clutch is being put to use.

Still another object of the invention is to provide a friction clutch which can compensate for at least some tolerances in the dimensioning and/or assembly of its parts.

A further object of the invention is to provide a friction clutch which is constructed in such a way that the magnitude of the disengaging force which must be applied subsequent to separation of the pressure plate and the counterpressure plate from the friction linings of the clutch disc remains unchanged or varies in a predictable and desirable manner during the entire useful life of the clutch.

Another object of the invention is to provide a friction clutch wherein the clutch engaging and disengaging forces are selected and controlled in such a way that they cannot adversely affect the operation of the wear compensating unit irrespective of whether the clutch is new or is in actual use for a shorter or longer interval of time.

An additional object of the invention is to provide a novel and improved arrangement of resilient energy storing means which act upon the pressure plate and/or upon the housing and/or upon the at least one diaphragm spring and/or upon the friction linings of the clutch disc in order to accomplish the preceding objects of the invention.

Still another object of the invention is to provide a novel and improved method of influencing certain constituents of a friction clutch for the purpose of ensuring a predictable generation, predictable variations and predictable magnitudes of forces which must be applied during engagement and/or disengagement of a friction clutch in the power train of a motor vehicle.

A further object of the invention is to provide a power train which embodies the above outlined friction clutch.

Another object of the invention is to provide a motor vehicle wherein the power train embodies a friction clutch of the above outlined character.

An additional object of the invention is to provide a friction clutch which exhibits or embodies the above outlined features and advantages and can be utilized as a superior substitute for heretofore known friction clutches in the power trains of passenger cars, trucks and/or other types of motor vehicles.

Still another object of the invention is to provide novel and improved torque transmitting connections between the pressure plate, the housing and the diaphragm spring(s) in a friction clutch of the above outlined character.

A further object of the invention is to provide a novel and improved connection between the wear compensating unit and other constituents of the above outlined friction clutch.

Another object of the invention is to provide novel and improved springs (such as leaf springs) for use in the above outlined friction clutch.

An additional object of the invention is to provide one or more multiple-purpose springs for use in a friction clutch of the above outlined character.

SUMMARY OF THE INVENTION

The invention is embodied in an engageable and disengageable friction clutch for use in a power train, such as the power train of a motor vehicle. The improved friction clutch comprises a housing which is rotatable about a predetermined axis, a pressure plate which is rotatable with and has limited freedom of axial movement relative to the housing to thus effect an engagement or disengagement of the clutch, and at least one clutch spring (hereinafter referred to as diaphragm spring) which operates between the housing and the pressure plate and assumes—at least in the engaged state of the friction clutch—a predetermined stressed condition which tends to vary in response to repeated engagement and disengagement and the resulting wear upon the clutch and in which condition the diaphragm spring urges the pressure plate axially of and away from the housing. The improved friction clutch further comprises means for compensating for wear upon the clutch, and such compensating means includes means for maintaining the diaphragm spring at least close to the predetermined stressed condition during an extended period of repeated engagement and disengagement of the clutch. Still further, the improved friction clutch comprises means for promoting disengagement of the clutch, and such promoting means includes energy storing resilient means for biasing the pressure plate toward the housing during disengagement of the clutch with a force which varies at least during disengagement of the clutch. It is often preferred that such force have a progressive character at least during disengagement of the clutch. The aforementioned extended period can match or at least approximate the useful life of the friction clutch in the power train.

The wear during the extended period of use (i.e., repeated engagement and disengagement) of the friction clutch entails a displacement of the pressure plate axially of and relative to the housing with attendant change in the amount of energy being stored by the resilient means of the disengagement promoting means. The change in the amount of energy being stored by the resilient means during axial displacement of the pressure plate as a result of wear is a degressive change.

The improved friction clutch further comprises a standard counterpressure plate (also called reaction plate) which is coaxial and rotatable with the housing, and a clutch plate or clutch disc (hereinafter called clutch disc) which is disposed between and receives torque from the pressure plate and the counterpressure plate in the engaged condition of the clutch. The conterpressure plate can comprise a flywheel which receives torque from the output shaft (such as the crankshaft or a camshaft) of the internal combustion engine in the power train of a motor vehicle).

The resilient energy storing means of the disengagement promoting means can comprise at least one leaf spring. In accordance with a presently preferred embodiment of the invention, the leaf spring is elongated and has a predetermined undulate shape. The disengagement promoting means which employs such leaf spring(s) can further comprise means for securing spaced-apart first and second portions of each leaf spring to the housing and to the pressure plate, respectively, to thus maintain the leaf spring(s) in a stressed condition as seen axially of the housing and longitudinally of each such spring. The arrangement is preferably such that each leaf spring is maintained in stressed condition owing to its predetermined undulate shape while the clutch is installed in the power train. Each leaf spring can be buckled transversely of its elongation (longitudinal direction) while (i.e., as long as) the friction clutch is installed in the power train.

The aforementioned wear upon one or more constituents of the friction clutch entails a displacement of the pressure plate axially of and relative to the housing, and the force which is being applied by the resilient energy storing means varies during such displacement as well as during the axial movement of the pressure plate relative to the housing.

It is often desirable to employ a pressure plate having an at least substantially circular shape, and the energy storing resilient means of the disengagement promoting means can comprise at least one leaf spring which extends at least substantially tangentially or circumferentially of the at least substantially circular pressure plate.

For example, the energy storing resilient means of the disengagement promoting means can comprise at least one elongated leaf spring having a first part including two end portions and a second part including a median portion. Such resilient means (i.e., the disengagement promoting means) further comprises means for connecting one of the two (first and second) parts to the housing, and means for connecting the other of the first and second parts to the pressure plate.

The means for compensating for wear of one or more constituents of the friction clutch is or can be installed in such a way that it is operative between the housing and the diaphragm spring.

The diaphragm spring is or can be tiltable relative to the housing, and the friction clutch then further comprises means for biasing the diaphragm spring in the axial direction of the housing as well as a seat assembly including first and second seats which are provided in the housing. The diaphragm spring is tiltable between the two seats and is tiltable relative to one of the seats during disengagement of the clutch; such friction clutch can further comprise means for biasing the one seat against the diaphragm spring. The one seat is movable in the axial direction of the housing, and the means for biasing the one seat against the diaphragm spring is preferably installed in such a way that it operates in parallel with the energy storing resilient means of the disengagement promoting means.

The friction linings of the clutch disc are subject to extensive wear as a result of repeated engagement and disengagement of the friction clutch and the clutch is disengageable in response to the application of a disengaging force which increases in response to increasing wear upon the friction linings of the clutch disc and which effects an at least slight movement of the aforementioned one (axially movable) seat at least during a portion or stage of disengagement of the clutch. The diaphragm spring is tiltable relative to the seats in response to the application of a force which increases during movement of the one seat in the axial direction of the housing.

The wear compensating means can comprise means for moving the one seat axially of the housing until the forces being exerted upon the diaphragm spring neutralize each other.

The means for biasing the one seat against the diaphragm spring can include an energy storing device which is arranged to apply to the one seat an at least substantially constant force within the aforementioned extended period of repeated engagement and disengagement of the friction clutch. Such energy storing device can comprise at least one diaphragm spring member, and the means for biasing the one seat against the diaphragm spring can further comprise at least one bias transmitting component between the at least one diaphragm spring member and the one seat. The means for moving the one seat axially of the housing can be arranged to maintain the one seat in motion until the forces being exerted upon the diaphragm spring (clutch spring) neutralize each other.

The friction clutch can be constructed and assembled in such a way that the fulcrum for the diaphragm spring is movable in the axial direction of the housing, and the diaphragm spring can be mounted for pivotal movement relative to the fulcrum at least during engagement of the clutch. The wear compensating means can comprise means for moving the fulcrum axially of the housing to an extent which is dependent upon the extent of wear upon the friction linings of the clutch disc.

The leaf spring or springs which operate between the housing and the pressure plate to bias the pressure plate in parallel with the resilient energy storing means in a direction to disengage the clutch can have a degressive characteristic, at least during disengagement of the clutch. Each leaf spring can be fixedly secured to at least one of the housing and the pressure plate and, as already mentioned hereinbefore, each such leaf spring can be arranged to transmit at least some torque between the housing and the pressure plate. The bias of the leaf spring(s) upon the pressure plate can be selected in such a way that it increases in response to the aforediscussed wear and the resulting axial movement of the pressure plate away from the housing.

The leaf spring(s) and the energy storing resilient means can jointly establish a force differential which is at least substantially constant and urges the pressure plate axially toward the housing. Alternatively, the leaf spring(s) and the energy storing resilient means can jointly establish a slightly increasing force differential which urges the pressure plate axially of and away from the housing. Such force differential can increase at a rate within the range of between about 5% and 25%.

The aforementioned seat assembly can comprise an annular seat which tiltably mounts the diaphragm spring on the housing, at least in the engaged condition of the friction clutch. The energy storing resilient means of the disengagement promoting means can comprise at least one first additional spring which serves to transmit torque between the housing and the pressure plate, and at least one second additional spring which is arranged to bias the pressure plate away from the housing. The first and second additional springs can be arranged to generate and to apply to the pressure plate a resultant force which opposes the force of the diaphragm spring during disengagement of the clutch and during the resultant axial movement of the pressure plate away from the friction linings of the clutch disc and which at least closely approximates a disengaging force acting upon the diaphragm spring subsequent to at least partial separation of the pressure plate from the friction linings. The energy storing resilient means of the disengagement promoting means can further comprise at least one third additional spring which is arranged to urge the friction linings of the clutch disc axially of the housing and away from each other. The aforementioned resultant force can be generated by the first and second additional springs jointly with the at least one third additional spring. The first additional spring can comprise one or more leaf springs.

The means for applying to the clutch a disengaging force includes means for moving the pressure plate axially of and away from the counterpressure plate and for thus disengaging the pressure plate from the friction linings (as well as for thus enabling the friction linings to become disengaged from the counterpressure plate). The energy storing resilient means of the disengagement promoting means can comprise a first additional spring which operates between the housing and the pressure plate, and a second additional spring which is arranged to transmit torque between the housing and the pressure plate. These additional springs can be arranged to directly generate a resultant force which at least approximates the disengaging force, at least while the pressure plate is out of contact with the friction linings.

The novel features which are considered as characteristic of the invention are set forth in particular in the appended claims. The improved friction clutch itself, however, both as to its construction and the modes of assembling and operating the same, together with numerous additional important and advantageous features and attributes thereof, will be best understood upon perusal of the following detailed description of certain presently preferred specific embodiments with reference to the accompanying drawings.

BRIEF DESCRIPTION OF THE DRAWINGS

FIG. 1 is a plan view of certain details of a friction clutch which embodies one form of the present invention;

FIG. 2 is a sectional view substantially as seen in the direction of arrows from the line II—II in FIG. 1;

FIG. 3 is an enlarged fragmentary side elevational view of a detail as seen in the direction of arrow III in FIG. 1;

FIG. 4 is a plan view of one of a set of leaf springs which are utilized in the friction clutch of FIGS. 1 to 3;

FIG. 5 is a side elevational view of the leaf spring as seen in the direction of arrow V in FIG. 4;

FIG. 6 is a plan view of one of another set of leaf springs which are utilized in the friction clutch of FIGS. 1 to 3;

FIG. 9 depicts a coordinate system wherein the curves indicate the magnitude of the clutch disengaging forces;

FIG. 10 is an axial sectional view of a modified friction clutch;

FIG. 11 is an enlarged side elevational view of a detail of the modified friction clutch substantially as seen in the direction of arrow XI in FIG. 10;

FIG. 14 shows a coordinate system wherein the curves denote various forces which are being applied to the clutch spring in the structure shown in FIGS. 10 and 11;

DESCRIPTION OF PREFERRED EMBODIMENTS

Figure 7:
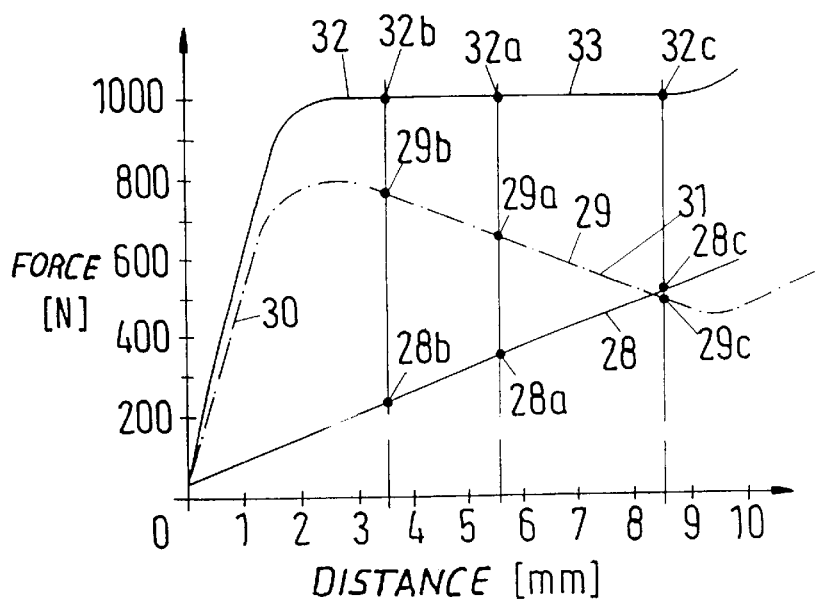
FIG. 7 shows a coordinate system wherein the curves indicate the characteristics of leaf springs of the type shown in FIGS. 4–5 and 6.

The friction clutch 1 which is shown in FIGS. 1 and 2 comprises a rotary housing or cover 2, an at least substantially circular pressure plate 3 which is rotatable with and has limited freedom of axial movement relative to the housing, at least one clutch spring 4 in the form of a diaphragm spring which at least indirectly reacts against the housing 2 and bears upon the pressure plate 3 (at least in the engaged condition or state of the clutch 1), a counterpressure plate 6 which is arranged to be driven by the engine in the power train of a motor vehicle and then transmits torque to the housing, to the pressure plate and to the diaphragm spring, and a clutch disc or clutch plate 8 having friction linings 7 located between the confronting friction surfaces of the plates 3, 6. The hub of the clutch disc 8 can transmit torque to the rotary input element (e.g., a shaft) of a variable-speed transmission in the power train.

The housing 2 carries an annular seat assembly 5 tiltably mounting a circumferentially complete radially outer or main portion 4a of the diaphragm spring 4. The clutch 1 is fully engaged when the friction surfaces of the plates 3, 6 clamp the adjacent friction linings 7 with a force that is necessary to ensure that the clutch disc 8 shares all angular movements of the parts 2, 3, 4 and 6. Partial engagement of the clutch 1 can be achieved by causing the pressure plate 3 to bear upon the adjacent friction linings 7 with a force which permits a certain amount of slip between the two plates 3, 6 on the one hand, and the clutch disc 8 on the other hand. The clutch 1 is fully disengaged when the plates 3, 6 can rotate independently of the clutch disc 8 and/or vice versa; this is accomplished by causing or permitting the pressure plate 3 to move axially of and toward the rear wall of the housing 2, i.e., away from the counterpressure plate 6 and from the friction linings 7.

The means for transmitting torque from the housing 2 to the pressure plate 3 (and preferably for urging the pressure plate axially in a direction from the counterpressure plate 6 toward the housing 2, at least during certain stages of operation of the clutch 1) comprises a first set of additional springs 9 in the form of leaf springs which extend circumferentially or tangentially of the pressure plate 3. As can be seen in FIGS. 3 and 6, one end portion 24 of each leaf spring 9 is affixed to the housing 2 by one distancing element 14 (such as a rivet) of one of several pairs of such fastening or connecting elements, and a tongue-like intermediate portion 15 of each leaf spring 9 is affixed to the pressure plate 3 by a rivet, bolt or an analogous connector 16. Each leaf spring 9 is actually a set or package of several (such as two) overlying leaf springs (see FIG. 3). The clutch 1 comprises three such sets of leaf springs 9 which are equidistant from each other as seen in the circumferential direction of the pressure plate 3. The leaf springs 9 oppose the bias of the diaphragm spring 4, at least in the at least partially engaged condition of the clutch 1, because they tend to urge the pressure plate 3 axially and away from the counterpressure plate 6, i.e., toward the rear wall of the housing 2.

A second set of additional springs 10 (or a single additional spring 10) forms part of the clutch disc 8 and serves to urge the two sets of friction linings 7 axially and away from each other. The spring or springs 10 (hereinafter referred to as springs) are effective in the fully engaged condition of the clutch 1 (at such time, the springs 10 serve to bias the two sets of friction linings 7 against the adjacent friction surfaces of the plates 3 and 6) as well as during that stage of partial engagement of the clutch when the pressure plate 3 is on its way toward the rear wall of the housing 2 but its friction surface still contacts the adjacent friction linings. The primary purpose of the springs 10 is to ensure a gradual buildup of torque transmission between the plates 3, 6 and the clutch disc 8 during engagement of the friction clutch 1, i.e., during axial movement of the pressure plate 3 (under the bias of the diaphragm spring 4 but against the opposition of the springs 9 and 10) toward the counterpressure plate 6. It is to be noted that the springs 10 constitute a desirable but optional feature of the clutch disc 8. Such springs can constitute resilient segments of the type shown and disclosed, for example, in the aforementioned commonly owned U.S. Pat. No. 5,450,934 granted Sep. 19, 1995 to Paul Maucher for "FRICTION CLUTCH". In the absence of the springs 10, the friction linings 7 are simply bonded and/or otherwise affixed to a washer-like radially outermost portion or carrier of the clutch disc 8.

In addition to the circumferentially complete annular radially outermost portion 4a, the diaphragm spring 4 comprises radially inwardly extending tongues or prongs 4b having radially innermost portions or tips 4c which must be depressed by a bearing or the like (reference may be had, for example, to the aforementioned commonly owned U.S. Pat. No. 5,632,365 granted May 27, 1997 to Paul Maucher for "FRICTION CLUTCH") in order to change the conicity of the spring 4 (i.e., to tilt the spring 4 relative to the annular pivot assembly 5) and to thus at least partially disengage the clutch 1.

That part of the annular portion 4a of the diaphragm spring 4 which bears upon an annular projection or an annulus of discrete lobes 3a of the pressure plate 3 is located radially outwardly of the annular pivot assembly 5 for the diahragm spring.

The friction clutch 1 of FIGS. 1 and 2 further comprises a third set of additional springs 11 (see also FIGS. 3, 4 and 5) each of which constitutes a stack or package of several (for example, three) superimposed or overlapping prestressed leaf springs. These springs operate between the housing 2 and the pressure plate 3 and are designed, prestressed and installed in such a way that they tend to move the pressure plate 3 axially toward the the housing 2 in the engaged condition of the clutch 1.

Each spring 11 has two end portions 12 which are fixedly connected to the housing 2 by pairs of distancing elements or rivets 14. As shown in FIG. 3 (and as already mentioned hereinbefore), one rivet 14 of each pair further serves to connect the end portion 24 of one of the three sets of leaf springs 9 to the housing 2. An intermediate portion 13 of each spring 11 is connected to the pressure plate 3 by one of the aforementioned rivets or bolts 16 which further serve to connect the pressure plate with the tongues 15 of the packages of leaf springs 9. The rivets or bolts 16 are fixedly anchored in discrete radial arms or cams 17 of the pressure plate 3. The three stacks of leaf springs 11 are or can be equidistant from each other, as seen in the circumferential direction of the pressure plate 3.

The configuration, initial stressing and mounting of the stacks of springs 11 are such that these springs bias the pressure plate 3 axially and away from the counterpressure plate 6 (i.e., toward the rear wall of the housing 2) during disengagement of the clutch 1. In addition, the bias of the springs 11 upon the pressure plate 3 varies progressively, at least during actual disengagement of the friction clutch 1. The arrangement is such that the bias of the springs 11 upon the pressure plate 3 increases (e.g., gradually) at least during that stage of disengagement of the clutch 1 which involves an axial movement of the pressure plate 3 away from the counterpressure plate 6 but while the pressure plate is still in contact with the adjacent friction linings 7 of the clutch disc 8.

The stacks of leaf springs 9 are connected between the housing 2 and the pressure plate 33 in a prestressed condition (as seen in the axial direction of the housing 2), the same as the stacks of springs 11. The initial stressing of each stack of leaf springs 9 is such that the bias of these leaf springs upon the pressure plate 3 decreases during disengagement of the clutch (i.e., the springs 9 apply a degressive force). The stacks of springs 9 and 11 act in parallel, i.e., the bias of the springs 9 upon the pressure plate 3 is added to or compounded with the bias of the springs 11.

FIGS. 4 and 5 show that the leaf springs 11 can consist of a thin or extremely thin metallic sheet material, e.g., a material having a thickness in the range of between 0.2 and 0.6 mm. However, it is also possible, at least under certain circumstances, to employ leaf springs 11 having a thickness in excess of 0.6 mm. For example, the springs 11 can be made by stamping from sheet- or strip-shaped blanks consisting of spring steel or the like.

FIG. 4 shows that the end portions 12 and the median portion 13 of each leaf spring 11 can be enlarged to thus avoid undue weakening owing to the provision of circular openings 12a and 13a for the shanks of the rivets 14 and 16, respectively.

As can be seen in FIG. 5, the end portions 12 of a spring 11 are at least substantially coplanar, and the median portion 13 bulges outwardly beyond and to one side of the common plane of the end portions 12. However, the configuration (and more specifically the curvature) of the median portion 13 changes (see FIG. 3) when a spring 11 is actually secured to the pressure plate 3 (by a rivet 16) and to the housing 2 (by two rivets 14). The configuration which is shown in FIG. 3 ensures that each properly installed spring 11 exhibits the desirable force-distance (i.e., load-travel or load-stroke) characteristics.

A comparison of the leaf springs 11 shown in FIGS. 3 and 5 shows that, when a spring 11 is properly installed in the friction clutch 1 and at least while the clutch is engaged, such spring is stressed (deformed) in the axial direction of the housing 2 and is also stressed (upset or caused to bulge at opposite sides of the respective rivet 16) in its longitudinal direction, i.e., as seen circumferentially of the pressure plate 3. The magnitude of the stresses (axially and/or circumferentially of the pressure plate 3) upon a properly installed spring 11 can be selected in advance by appropriate selection of the distance between the two openings 12a, of the distance between the respective rivets 14, and of the initial curvature of the median portion 13.

As can be seen in FIGS. 3 and 6, each leaf spring 9 has a U-shaped cutout 18 which surrounds the tongue 15. The longer sides of the cutout 18 are flanked by two elongated parallel strip-shaped webs 20, and these webs are connected to the adjacent end 19 of the tongue 15 by a transverse connector portion 21 of the spring 9. The tip 26 of the tongue 15 is adjacent a connector portion 22 between the webs 20 and the extensions 23 of the end portion 24. The end portion 24 has an opening 25 for the shank of one of the respective pair of rivets 14, i.e., the end portion 24 of each leaf spring 9 is affixed to the housing 2. An opening 27 in the tongue 15 provides a passage for the shank of the respective rivet 16, i.e., of the means for connecting the tongue 15 to the adjacent cam 17 of the pressure plate 3.

It is clear that the functions of the openings 25 and 27 can be reversed, i.e., the tongue 15 can be secured to the housing 2 and the end portion 24 can be affixed to the pressure plate 3.

FIG. 3 further shows that the leaf spring 9 which is shown therein is installed in a prestressed condition, at least when the clutch 1 is engaged; at such times, the tongue 15 is bent out of the general plane of the remaining major portion (20, 21, 22, 23, 24) of the spring 9. The arrangement is preferably such that the leaf spring 9 of FIG. 3 is stressed in the axial direction of the housing 2 and tends to move the pressure plate 3 axially toward the rear wall of the housing 2.

The illustrated configuration of the leaf springs 9 renders it possible to ensure that the pressure plate 3 can cover relatively long distances axially of the housing 2 toward and away from the counterpressure plate 6 even though the distance between the openings 25, 27 of each spring 9 (i.e., the effective length of each such spring) is surprisingly short.

In the coordinate system of FIG. 7, the force (in Newtons) is measured along the ordinate, and the distance (travel) in mm is measured along the abscissa. The curve 28 is characteristic of the variations of force generated by the springs 9, the curve 29 is characteristic of the variations of force generated by the springs 11, and the curve 32 is representative of the resultant force, i.e., of the combined forces of the springs 9 and 11. It will be seen that the force denoted by the curve 28 increases proportionally (progressively), i.e., the curve 28 is a straight line. However, it is equally possible to select the mounting and/or the characteristics of the springs 9 in such a way that the curve 28 has a progress (e.g., a curvature) departing from that shown in FIG. 7.

The curve 29 of FIG. 7 indicates that, starting from a condition when the springs 11 store no energy or a minimum amount of energy, the force increases linearly or substantially linearly (as denoted by the portion 30 of the curve 29). The force which is being generated by the springs 11 thereupon undergoes a gradual decrease (as indicated by the straight portion 31 of the curve 29). The slope and the exact configuration of the portion 31 of the curve 29 can be influenced (i.e., the portion 31 can depart from a straight line) by appropriate selection of the material, configuration, manner of mounting and/or other parameters of the springs 11. For example, the parameters of the springs 11 can be readily selected in such a way that the portion 30 and/or 31 of the curve 29 departs from a straight line.

The resultant (see the curve 32) of the forces generated by the springs 9 and 11 and represented by the curves 28, 29 includes a portion 33 which is at least substantially parallel to the abscissa, i.e., it denotes a resultant force which is at least substantially constant. In other words, the combined force furnished by the springs 9 and 11 and acting upon the pressure plate 3 while the latter covers a distance of approximately 5 mm (between the points 32b and 32c) is at least nearly constant. This is desirable and advantageous because the operating point of the friction clutch 1 (in the engaged condition of the clutch) remains at least nearly constant. This, in turn, ensures the establishment of an at least substantially constant operating range for the diaphragm spring 4.

In order to disengage the clutch 1, the operator of the motor vehicle causes the aforementioned release bearing to engage and to depress (note the arrow A in FIG. 2) the tips 4c of the prongs or tongues 4b forming part of the diaphragm spring 4. This causes the spring 4 to pivot at the seat assembly 5, not unlike a two-armed lever. Such pivoting of the spring 4 causes the radially outer portion 4a to reduce the bias upon the adjacent portion(s) of the pressure plate 3. This, in turn, enables the springs 9, 11 to dissipate energy and to cause the pressure plate 3 to follow the movement of the radially outer portion 4a of the diaphragm spring 4 toward the rear wall of the housing 2.

The friction linings 7 of the clutch disc 8 become disengaged from the adjacent friction surfaces of the plates 3 and 6 after the pressure plate 3 completes a certain movement in the axial direction of the housing 2 and away from the counterpressure plate 6. At such time, the springs 10 cease to bias the two sets of friction linings 7 axially and away from each other, i.e., the springs 10 no longer assist the springs 9, 11 in moving the pressure plate 3 toward the rear wall of the housing 2. In other words, once the friction surface of the pressure plate 3 no longer contacts the adjacent friction linings 7, the force which urges the portions 3a of the pressure plate 3 against the radially outer portion 4a of the diaphragm spring 4 is furnished solely by the springs 9 and 11.

The illustrated seat assembly 5 comprises an annular member 34 which is installed between the rear wall of the housing 2 and the radially outer portion 4a of the diaphragm spring 4 radially inwardly of the portions 3a of the pressure plate 3. The annular member 34 is clamped between the housing 2 and the pressure plate 3 at least in the engaged condition of the clutch 1. The member 34 provides a fulcrum for the tilting of the spring 4 and, in the embodiment of FIGS. 1 and 2, forms part of an adjusting or wear compensating unit or means 35. The unit 35 ensures that no clearance or play develops between the annular member 34 and the diaphragm spring 4 in response to axial displacement of the diaphragm spring as a result of wear upon the friction linings 7. Such axial displacement of the diaphragm spring 4 will be described in considerable detail hereinafter.

The annular member 34, which also acts as a seat for the diaphragm spring 4, is provided with circumferentially extending and axially sloping ramps 36 cooperating with complementary ramps 37 which are impressed into or otherwise formed in or affixed to the inner side of the rear wall of the housing 2. The lengths and the slopes of the ramps 36, 37 (as seen in the circumferential direction of the annular seat 34) are selected in such a way that the axial position of the pressure plate 3 relative to the housing 2 (in order to compensate for wear, particularly upon the friction linings 7 of the clutch disc 8 but also for wear upon certain other parts of the clutch 1, such as upon the friction surfaces of the plates 3, 6 and the diaphragm spring 4) can be adjusted during an extended period of time involving repeated engagement and disengagement of the clutch 1, preferably (and in many or most instances) during the entire useful life of the clutch. Certain preferred designs and the purpose and advantages of such ramps are fully described and illustrated in numerous U.S. patents of the assigneee of the present aplication as well as in the aforementioned pending U.S. patent application Ser. No. 08/211,020 corresponding to published German patent application Ser. No. 43 22 677.

The compensating means 35 including the annular seat 34 further comprises means for biasing the seat 34 in the circumferential direction, namely in a sense to move the seat 34 axially of and away from the rear wall of the housing 2, i.e., toward the friction linings 7 and the counterpressure plate 6. Thus, when the seat 34 turns about the axis X—X (relative to the housing 2), the ramps 36 slide along the neighboring ramps 37 in a sense to move the seat 34 downwardly, as viewed in FIG. 2. The means for biasing the seat 34 comprises a set of three prestressed coil springs 38 which extend tangentially of the seat and are equidistant from each other as seen in the circumferential direction of the two annuli of ramps 36, 37. When the coil springs 38 are free to turn the seat 34 relative to the housing 2, the seat is caused to move in the direction of arrow A (FIG. 2), i.e., in the direction of movement of the tips 4c of the prongs 4b of the diaphragm spring 4 during disengagement of the clutch 1 and counter to the direction of movement of the pressure plate 3 during disengagement of the clutch 1.

Figure 8:
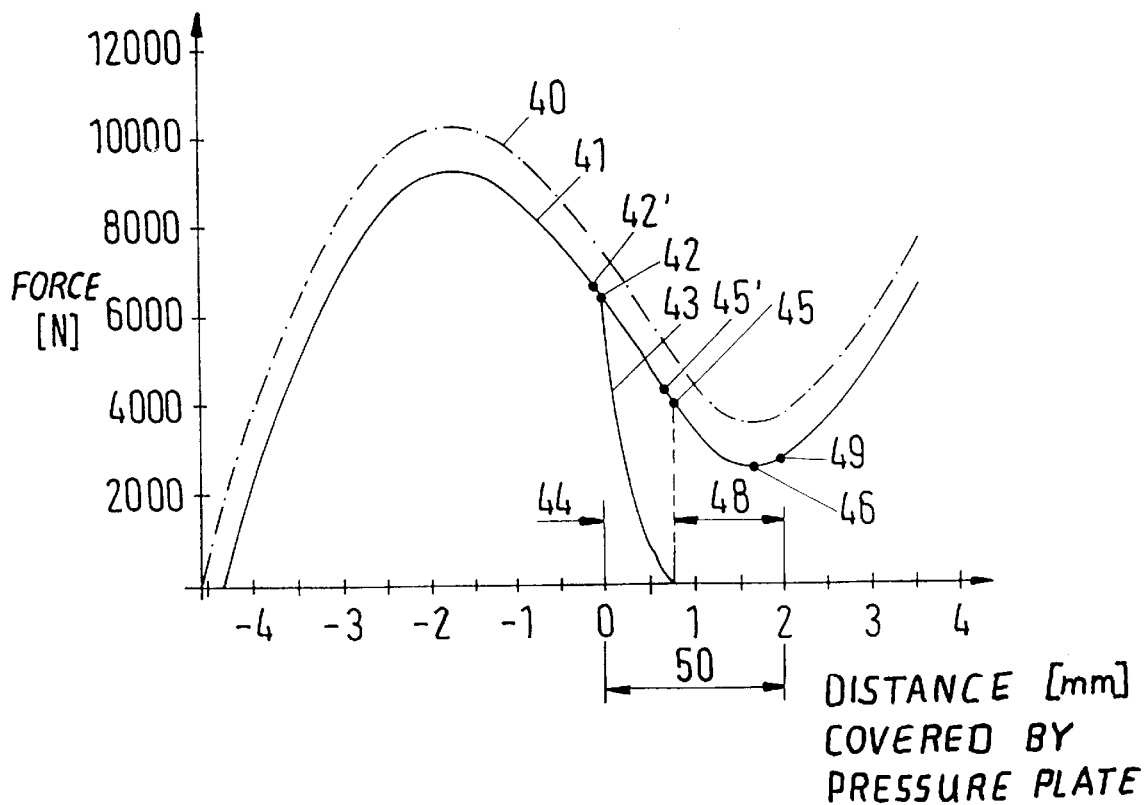
FIG. 8 illustrates a coordinate system wherein the curves indicate variations of the magnitude of the forces being applied to the pressure plate of the clutch in different axial positions of the pressure plate.

The mode of operation of the clutch 1 will be described in greater detail with reference to the coordinate systems which are shown in FIGS. 7 to 9.

The curve 40 in the system of FIG. 8 represents the variations of force which is furnished by the diaphragm spring 4 when the latter is deformed (tilted) between two radially spaced apart annular fulcra one of which is provided by the seat assembly 5 and the other of which is provided by the locations of abutment between the radially outer potion 4a of the diaphragm spring 4 and the annular array of lobes 3a (or a single circumferentially complete annular projection) of the pressure plate 3. The curve 41 of FIG. 8 denotes the force which must be applied to the pressure plate 3 counter to the direction of the arrow A in order to effect a change of conicity of the diaphragm spring 4. The difference between the forces represented by the curves 40 and 41 is indicative of the force which is furnished by the two sets of leaf springs 9 and 11, and such resultant force opposes the force which the diaphragm spring 4 applies to the pressure plate 3.

The point 42 on the curve 41 represents the force which is being applied by the diaphragm spring 4 when the clutch 1 is engaged, i.e., the maximum force which the spring 4 exerts due to the initial stress which has been selected for this spring during assembly of a new clutch. The exact location of the point 42 on the curve 41 can be shifted (upwardly or downwardly) by selecting a different conicity for the spring 4.

The curve 43 of FIG. 8 is representative of a (spreading) force which is being furnished by the resilient segments 10 of the clutch disc 8 and which tends to move the two friction linings 7 axially and away from each other. In addition, the curve 43 can represent one or more additional variable forces which act in the same way as the bias of the resilient segments 10, such as the resiliency of the housing 2, the resiliency of the friction linings 7, and others. The force or forces represented by the curve 43 opposes or oppose the bias of the diaphragm spring 4 upon the pressure plate 3; such force or forces decrease during disengagement of the clutch 1 because the resilient segments 10 are free to dissipate energy while the pressure plate 3 is in the process of moving axially of and away from the counterpressure plate 6 and friction linings 7. The extent of dissipation of energy by the resilient segments 10 during disengagement of the clutch 1 is shown at 44.

An advantage of the feature that the resilient segments 10 bias the pressure plate 3 in a direction to disengage the clutch 1 is that this renders it possible to reduce the magnitude of the disengaging force which must be applied to the tips 4c of the prongs 4b in order to change the conicity of the diaphragm spring 4. In other words, the magnitude of the disengaging force which must be applied to the tips 4c of the prongs 4b is less than would be necessary in view of the location of the point 42 on the curve 41 of FIG. 8 because the resilient segments 10 tend to disengage the clutch.

When the magnitude of the force represented by the curve 41 reaches or exceeds that represented by the point 45, the pressure plate 3 no longer contacts the adjacent friction linings 7. Therefore, and in view of its degressive characteristic, the force which is required to continue to tilt the diaphragm spring 4 in a sense to permit the pressure plate 3 to move further away from the friction linings 7 is reduced considerably, namely in comparison with that force which would be expected in view of the selected position of the point 42 on the curve 41.

When the force denoted by the point 45 on the curve 41 is exceeded, the force which is required to continue to change the conicity of the diaphragm spring 4 in a sense to allow the pressure plate 3 to move away from the clutch disc 8 continues to decrease up to the point 46 (denoting the minimal force). If the point 46 is exceeded, the magnitude of the disengaging force begins to rise. However, it is possible to provide suitable means (such as a servo spring, not shown) which prevents a rise of the disengaging force (or at least reduces the extent of such rise) when the disengaging force reaches the point 46 of the curve 41. Reference may be had, for example, to the aforementioned U.S. Pat. No. 5,632,365 corresponding to the published German patent application Ser. No. 195 10 905.

The curve 47 in the coordinate system of FIG. 9 denotes the variations of the disengaging force which is necessary to move the pressure plate 3 axially of and away from the counterpressure plate 6, i.e., away from the friction linings 7 of the clutch disc 8. As already mentioned above, the disengaging force is applied (e.g., by a release bearing, by a pivotable fork or the like) to the tips 4c of the prongs 4b in order to tilt the diaphragm spring 4 so that its radially outer portion 4a moves away from the counterpressure plate 6. The extent of axial movement of the tips 4c in a direction toward the counterpressure plate 6 in order to disengage the clutch 1 greatly or appreciably exceeds the extent of axial movement of the radially outer portion 4a of the diaphragm spring 4 away from the counterpressure plate. Thus, and in order to move the pressure plate 3 to the fully retracted position nearest to the rear wall of the housing 2, it is necessary that the extent of axial movement of the tips 4c (toward the clutch disc 8) exceed the extent of axial movement of the radially outer portion 4a (away from the clutch disc 8) by a factor which corresponds to the ratio of the lever arm of the portion 4a to that of the tips 4c. Otherwise stated, the ratio of the extent of axial movement of the tips 4c to that of axial movement of the portion 4a corresponds to the ratio of the radial distance between the tips 4c and the seat 34 to that of the radial distance between the portions 3a of the pressure plate 3 and the seat 34. Such ratio is normally in the range of between 3:1 and 5:1. The ratio of the disengaging force to be applied to the tips 4c in view of the relationship of the aforediscussed lever arms is in the range of between 1:5 and 1:3. Reference may be had to the curve 41 in the coordinate system of FIG. 8.

The distance 48 (in mm) in the coordinate system of FIG. 8 represents the extent of axial movement of the pressure plate 3 between two positions corresponding to initial disengagement of the pressure plate 3 from the friction linings 7 and the position of the plate 3 at a maximum distance from the friction linings. The distance 50 to be covered by the pressure plate 3 between its two end positions (in the fully engaged and fully disengaged conditions of the clutch 1) equals 44+48. The point 49 on the curve 41 (force to be applied to the pressure plate 3) corresponds to the fully disengaged condition of the clutch.

In many instances, the distances 48 and 50 (namely the distance covered by the pressure plate 3 from initial disengagement from the friction linings 7 to a position corresponding to full disengagement of the clutch, and from a position corresponding to full engagement to that corresponding to full disengagement of the clutch) are or can be selected in such a way that the disengaging force at the point 49 of the curve 41 (full disengagement of the clutch) is less than at the point 45 (initial disengagement of the pressure plate 3 from the friction linings 7).

The points 28a, 29a, 32a of the respective curves 28, 29, 32 in the coordinate system of FIG. 7 represent those individual forces (curves 28, 29) and that sum of forces (curve 32) which are being applied by the two sets of leaf springs 9 and 11 to the pressure plate 3 in the engaged condition of the friction clutch 1. The points 28b, 29b, 32b denote the corresponding forces when the clutch 1 is fully disengaged. It is assumed here that the clutch disc 8 is still new (i.e., that the wear upon the friction linings 7 is nil). The points 28c, 29c, 32c on the respective curves 28, 29, 32 denote those forces which must be applied when the wear upon the friction linings 7 reaches a maximum permissible value. The practically horizontal stretch 33 of the curve 32 in FIG. 7 denotes that the magnitude of the sum of forces acting upon the pressure plate 3 and upon the diaphragm spring 4 remains at least substantially unchanged during the entire useful life of the clutch 1 or its clutch disc 8.

The sets of leaf springs 9 and 11 of the friction clutch 1 which is shown in FIGS. 1 to 6 act as sensors, and more specifically as force sensors, in that they cooperate with the adjusting or wear compensating unit 35 to ensure that the clutch can operate properly and predictably in spite of progressing wear, primarily upon the friction linings 7 but also upon at least some other constituents such as the plates 3, 6 and the diaphragm spring 4.

In order to disengage the clutch 1, the aforementioned release bearing or an equivalent device applies to the tips 4c of the prongs 4b a force in the direction of the arrow A shown in FIG. 2. The magnitude of the disengaging force is denoted by the aforediscussed curve 47 in the coordinate system of FIG. 9. This Figure further shows that a first stage (51) of total or overall movement (52) of the tips 4c in a direction toward the clutch disc 8 and counterpressure plate 6 involves the application of a gradually increasing disengaging force as indicated by the portion 47a of the curve 47. At such time, the pressure plate 3 is being acted upon by a combined (resultant) force which acts in the axial direction of the housing 2 and is the sum of the forces generated by the resilient segments 10 of the clutch disc 8 as well as of the forces generated by the sets of leaf springs 9 and 11. The curve 53 in the system of FIG. 9 denotes (within the stage 51) the magnitude of the force acting between the pressure plate 3 and the diaphragm spring 4. The point 54 represents the condition of the clutch 1 at the time when the pressure of the plate 3 upon the friction linings 7 is at least close to zero.

When the point 54 is exceeded (as measured along the abscissa) in a direction toward full disengagement of the clutch 1, the required disengaging force progresses in a manner as indicated by the portion 47b of the curve 47. Also, when the point 54 is exceeded, the resilient segments 10 no longer contribute to the disengaging force because the pressure plate 3 no longer contacts the adjacent friction linings 7. Thus, the pressure plate 3 is then biased only by the two sets of leaf springs 9 and 11, i.e., the resultant force acting upon the plate 3 is then a sum of the forces being applied by the springs 9 and 11; such resultant force urges the pressure plate 3 against the radially outer portion 4a of the diaphragm spring 4. Reference may be had again to the portion 33 of the curve 32 in the coordinate system of FIG. 7. Such force is being applied at least while the pressure plate 3 covers the portion 55 of the overall distance 52 between its extreme positions in the fully engaged and fully disengaged conditions of the clutch 1.

FIG. 9 shows that, when the clutch disengaging force proceeds as indicated by the portion 47b of the curve 47 beyond the point 54, the magnitude of such force (acting upon the tips 4c) decreases in such a way that it is less than the force denoted by the portion 55 of the curve 53. Such relationship between the forces denoted by the curves 47 and 53 prevails to the point 56.

An advantage of the relationship of forces (denoted by the portions 47b, 55 of the respective curves 47, 53) between the points 54 and 56 is that the diaphragm spring 4 remains in contact with the annular seat 34, i.e., that the spring 4 continues to be suported by the housing 2 (as seen in the direction of the axis X—X). The point 54 on the curves 47, 53 of FIG. 9 corresponds to the pont 49 of the curve 41 in FIG. 8.

Referring again to FIG. 9, it will be seen that the friction clutch 1 is designed in such a way that the point 57 corresponding to a disengaging force upon complete disengagement of the clutch does not coincide with the point 56 where the curve 47 intersects the curve 53 (and more specifically where the portions 47b and 55 of these curves cross each other). This ensures that, even if the extent of required total distance to be covered by the tips 4c of the prongs 4b is exceeded during disengagement of the clutch, no undesirable "compensation" for non-existent wear can take place as a result of angular displacement of the seat 34 and its ramps 36 relative to the ramps 37 of the housing 2. This is due to the fact that the diaphragm spring 4 continues to urge the seat 34 against the housing 2 with a force which prevents the coil springs 38 from turning the seat 34 relative to the rear wall of the housing 2.

The clutch disengaging or release assembly which causes the tips 4c of the prongs 4b to move in the direction of the axis X—X and toward the clutch disc 8 if the clutch 1 is to be disengaged must be designed in such a way that the point 56 on the curves 47, 53 of FIG. 9 cannot be exceeded. If desired, the clutch 1 can comprise (or it can cooperate with) a suitable stop which limits the extent of pivotal or tilting or concavity changing movement of the diaphragm spring 4. Referring to FIG. 2, there is shown an annular abutment or stop 58 which can form part of the housing 2 and is located in the path of movement of the tips 4c. It goes without saying that, if the clutch 1 embodies an abutment or stop corresponding to that shown at 58, the dimensions of the prongs 4b must be selected with a view to ensure that their tips 4c can be arrested by such a stop during the required stage of disengagement of the clutch, namely shortly before the extent of movement of the tips 4c reaches the value corresponding to that of the point 56 of intersection of the portions 47b, 55 of the curves 47, 53 in the coordinate system of FIG. 9.

The exact purpose of the stop 58, and of equivalent or analogous means for preventing excessive movements of the clutch disengaging means, is disclosed in the aforementioned pending U.S. patent application Ser. No. 08/211,020 corresponding to the published German patent application Ser. No. 43 22 677. This publication also describes the undertakings which must be resorted to in order to limit the disengaging force, i.e., to determine the maximum force to be applied to the tips 4c of the prongs 4b forming part of a diaphragm spring corresponding to the clutch spring 4 in the friction clutch 1 of FIGS. 1 to 6.

The preceding description of operation of the friction clutch 1 is based on the assumption that the diaphragm spring 4 was installed under a predetermined initial stress and that the wear upon the friction linings 7 was zero. If the friction linings 7 have already undergone a certain amount of wear (such wear is normally accompanied by some wear upon the friction surfaces of the plates 3, 6 and upon the diaphragm spring 4), the pressure plate 3 moves toward the counterpressure plate 6 and this entails a change of conicity of the diaphragm spring 4 as well as a change (namely an increase) of the magnitude of the force being exerted by the spring 4 upon the pressure plate 3 in the engaged condition of the clutch 1. This, in turn, entails that the point 42 on the curve 41 of FIG. 8 migrates toward the point 42'. At the same time, the point 45 on the curve 41 migrates toward the point 45'. Such shifting or migration causes a departure from the originally prevailing state of equilibrium of axial forces during engagement of the clutch. The rise of the bias of the diaphragm spring 4 upon the pressure plate 3 due to wear upon the friction linings 7 also causes a shift of the progress of the disengaging force, namely the disengaging force increases.

The just mentioned rise of the disengaging force causes that the resultant force exerted by the sets of leaf springs 9 and 11 upon the diaphragm spring 4 is overcome. Consequently, that portion of the diaphragm spring which abuts the annular seat 34 is caused to move axially of the housing 2 (and more specifically to change its conicity) to an extent which is needed to compensate for wear at least upon the friction linings 7. During such axial shifting, the radially outer portion 4a of the spring 4 continues to abut the portion(s) 3a of the pressure plate 3, and this brings about a change of conicity of the diaphragm spring. Such change of conicity causes a change of the amount of energy being stored by the spring 4 with attendant change in the amount of torque and a change of the force which the spring 4 applies to the pressure plate 3. The results of such changes can be appreciated by referring to the coordinate system of FIG. 8 which shows that the magnitude of the force being applied by the spring 4 decreases, and such reduction of the force being applied to the pressure plate 3 continues until the axial force generated mainly by the spring 4 and in part by the coil springs 48 (by way of the ramps 36, 37) is balanced by the resultant force furnished by the two sets of leaf springs 9 and 11. This means that (and referring again to FIG. 8) the points 42' and 45' respectively advance back toward the respective points 42 and 45.

Once the state of equilibrium is reestablished, the diaphragm spring 4 can be tilted at the radial level of the seat assembly 5 and the pressure plate 3 can become disengaged from the friction linings 7. It will be seen that a compensation for wear upon the friction linings 7 and upon certain other constituents of the clutch 1 takes place during disengagement of the clutch, and such compensation is effected by the coil springs 38 which are then free to turn the annular seat 34 relative to the housing 2 so that the ramps 36 ride along the neighboring ramps 37 in a direction to move the seat 34 axially toward the counterpressure plate 6. Once the compensation for wear is completed, the magnitude of the required disengaging force again matches that denoted by the curve 47 in the coordinate system of FIG. 9.

It will be appreciated that, in actual use of the friction clutch 1, compensation for wear upon the friction linings 7, etc. takes place in a large number of minute rapidly following steps, i.e., practically continuously. In other words, the extents of adjustments shown in the drawings are greatly exaggerated for the sake of clarity.

The friction clutch 101 which is shown in FIGS. 10 and 11 comprises a housing or cover 102 and a pressure plate 103 which is compelled to rotate with but has limited freedom of axial movability relative to the housing. A diaphragm spring 104 is installed, in stressed condition, between the pressure plate 103 and the housing 102 (as seen in the direction of the common axis X—X of the parts 102, 103 and 104). The spring 104 is tiltable relative to a fulcrum defined by an annular seat assembly 105 which is carried by the housing 102. The purpose of the spring 104 is to bias the pressure plate 103 axially against the friction linings of a clutch disc (not shown) which is installed between the pressure plate and a counterpressure plate (not shown), such as a flywheel affixed to and receiving torque from the output shaft of an internal combustion engine in the power train of a motor vehicle.

The means for transmitting torque between the housing 102 and the pressure plate 103 comprises a set of leaf springs 109 which extend circumferentially (tangentially) of the radially outermost marginal portion of the pressure plate. As a rule, or in many instances, the leaf springs 109 are installed in prestressed condition so that they tend to urge the pressure plate 103 axially of and toward the rear wall of the housing 102, i.e., in a direction to disengage the clutch 101.

However, it is equally possible, and under certain circumstances desirable, to design and install and stress the leaf springs 109 in such a way that they oppose (at least during certain stages of disengagement of the clutch) an axial movement of the pressure plate 103 toward the rear wall of the housing 102.

The diaphragm spring 104 comprises a circumferentially complete annular radially outer portion 104a and a set of tongues or prongs 104b which extend radially inwardly from the radially innermost part of the annular portion 104a. The annular portion 104a bears upon a single annular projection or against an annular array of discrete projections close to the periphery of the pressure plate 103. The fulcrum which is defined for the diaphragm spring 104 by the annular seat assembly 105 is located radially inwardly of the locus or loci where the annular portion 104a bears upon the pressure plate 103.

FIG. 11 shows that the friction clutch 101 further comprises a second set of leaf springs 111 which are mounted in a manner similar to that described for the leaf springs 11 shown in FIGS. 2 to 5. The leaf springs 111 tend to move the pressure plate 103 axially and toward the rear wall of the housing 102, i.e., toward the axial position which the pressure plate assumes when the clutch 101 is disengaged.

The clutch 101 further comprises a diaphragm spring member 159 which operates between the pressure plate 103 and the spring 104 and can take over the function of the leaf springs 9 in the clutch 1 of FIGS. 1 to 6. The spring member 159 can be said to constitute or to act as a membrane and comprises a resilient main portion or body 159a as well as tongues or projections 159b which extend radially inwardly from the main portion 159a. The projections 159b bear upon the tongues 104b to bias the diaphragm spring 104 axially toward the rear wall of the housing 102. The spring member 159 further comprises a second set of projections or tongues 159c which extend radially outwardly from the main portion 159a and which react against the housing 102, and more specifically against the heads 160 of rivets or bolts 161 which are anchored in the housing 102. The rivets or bolts 161 form an annular array and include portions which extend through windows provided therefor in the diaphragm spring 104. These rivets or bolts serve as distancing elements as well as to center the spring member 159 relative to the housing 102. At the same time, the rivets or bolts center the housing 102 and the diaphragm spring 104 relative to each other. It is presently preferred to employ a set of rivets or bolts 161 which are equidistant from each other as seen in the circumferential direction of the radially outer portion 104a of the spring 104. For example, the clutch 101 can comprise a set of rivets or bolts 161 the total number of which can be between 3 and 18.

The seat assembly 105 comprises an annular seat 134 which is, or which can be, a functional equivalent of the annular seat 34 in the friction clutch 1 of FIGS. 1 to 6. The seat 134 is mounted between the rear wall of the housing 102 and the adjacent side of the diaphragm spring 104.

The characteristics of the springs 104, 109, 111, 138 and 159 which are utilized in the friction clutch 101 of FIGS. 10 and 11 are related or atuned to each other in such a way that, at least when the clutch 101 is or is close to being disengaged (i.e., when the bias upon the friction linings of the clutch disc adjacent the right-hand side of the pressure plate 103 shown in FIG. 1 is at least close to zero), the sum of the disengaging forces acting upon the tips 104c of the resilient tongues 104b of the diaphragm spring 104 in the direction of the arrow A shown in FIG. 10 and the axial force applied to the spring 104 by the coil springs 138 (corresponding to the coil springs 38 shown in FIG. 1) by way of the annular seat 134 is balanced by or is slightly less than the sum of forces applied to the spring 104 by the sets of leaf springs 109, 111 and by the energy storing spring member 159 which constitutes or acts not unlike a diaphragm spring. Such state of equilibrium or quasi equilibrium between the forces which act upon the opposite sides of the spring 104 during actuation of the clutch 101 is comparable (or corresponds) to that denoted by the point 45 on the curve 41 of FIG. 8.

The just discussed state of equilibrium no longer exists when the friction linings of the clutch disc being utilized in the clutch 101 have undergone a certain amount of wear; the state of equilibrium is disturbed or terminated in a manner as described with reference to FIGS. 8 and 9, and this again initiates an adjustment or compensation for wear. Each such compensation involves a certain minor axial shifting of the clutch disc 104 in the direction of the arrow A. Such axial shifting of the diaphragm spring 104 entails a certain relaxation of axial bias upon the annular seat 134 so that the coil springs 138 can cause the annulus of ramps on the seat 134 to slide along the adjacent ramps at the inner side of the rear wall of the housing 102. In other words, the seat 134 is caused to follow the axial movement of the spring 104 in a direction toward the clutch disc cooperating with the pressure plate 103. Axial shifting of the diaphragm spring 104 to the extent which is required to compensate for wear upon the friction linings results in a change in the condition of (namely the amount of energy stored by) the energy storing device (diaphragm spring) 159.

As can be seen in FIG. 10, the radial offset between the fulcrum (seat 134) for the diaphragm spring 104 and the radially outer section or portion 159c of the diaphragm spring member 159 for the spring 104 results in an elastic deformation of the member 159 during actuation of the clutch 101 in such a way that the conicity of the member 159 is changed. Such deformation of the member 159 can be resorted to for a reduction of the likelihood of excessive movement during actuation of the clutch. In the embodiment of FIGS. 10 and 11, this advantage is accomplished in that, as the extent of movement of the tips 104c of the prongs 104b increases, the member 159 undergoes a progressive elastic deformation and its axially acting force upon the diaphragm spring 104 increases.

Figure 12:
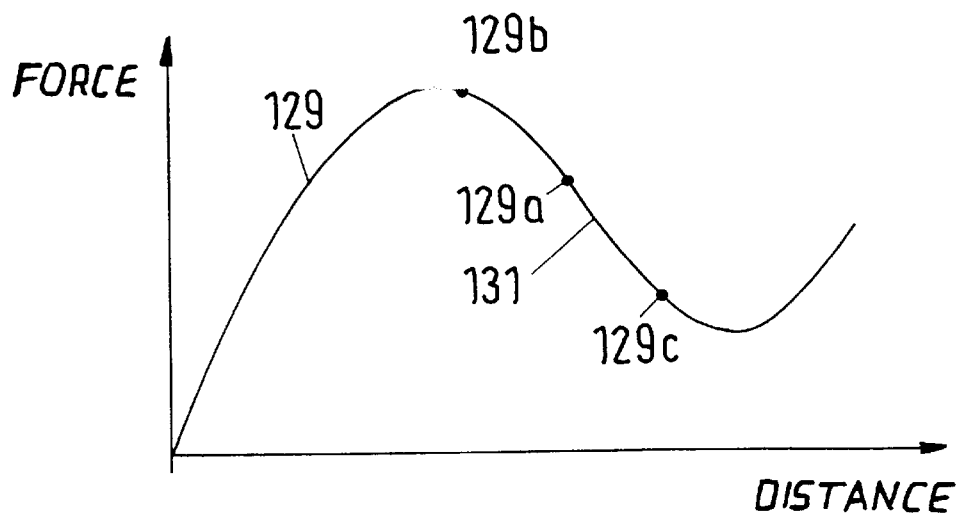
FIG. 12 shows a coordinate system wherein the curve is indicative of the characteristics of certain springs in the friction clutch of FIGS. 10 and 11.

The curve 129 in the coordinate system of FIG. 12 is representative of the force-to-distance relationship of the leaf springs 109 and 111. If the leaf springs 109 are omitted, the characteristics of the leaf springs 111 must be corrected accordingly in order to ensure that the configuration of the sinusoidal curve 129 remains at least substantially unchanged. For example, if the leaf springs 109 are omitted, the clutch 101 can comprise a form-locking connection between the housing 102 and the pressure plate 103. In the embodiment of FIGS. 10 and 11, the means for transmitting torque between the housing 102 and the pressure plate 103 can include the rivets or bolts 116 which form part of the means for fastening the leaf springs 111 to the pressure plate 103. The shanks of these bolts 116 extend through suitable openings of the housing 102.

The sinusoidal shape of the characteristic curve 129 in the system of FIG. 12 is attributable primarily (or exclusively) to the spring characteristic which is generated by the leaf springs 111. This curve includes a portion or section 131 which indicates that the force (measured along the ordinate) decreases in response to increasing extent of deformation (as measured along the abscissa). The section 131 can be straight or exhibits a slight curvature.

When the friction clutch 101 is freshly assembled and the friction linings of its clutch disc are still new, the stressing of the leaf springs 109 and 111 is such that it corresponds to (i.e., is represented by) the point 129a of the curve 129 in FIG. 12. The point 129b of the curve 129 denotes the stressing of the leaf springs 109, 111 when the freshly assembled friction clutch 111 (with new friction linings) is disengaged.

As the wear upon certain constituents of the clutch 101 progresses (this applies especially for the friction linings of the clutch disc which cooperates with the pressure plate 103 and the non-illustrated counterpressure plate), the pressure plate 103—and hence also the diaphragm spring 104—advances in a direction to the right (as viewed in FIG. 10), i.e., away from the rear wall of the housing 102. Such migration of the plate 103 and spring 104 results in a change in the amount of energy stored by the leaf springs 109 and 111 as well as by the diaphragm spring-shaped energy storing device 159. With reference to FIG. 12, this denotes that the points 129a, 129b migrate along the degressive portion 131 of the curve 129 in the system of FIG. 12, namely toward a minimal value.

The point 129c on the curve 129 in FIG. 12 is indicative of those conditions of the leaf springs 109, 111 when the clutch 101 is engaged and the extent of wear upon the friction linings (and normally also certain other constituents of the clutch 101) has risen to a maximum permissible value.

Figure 13:
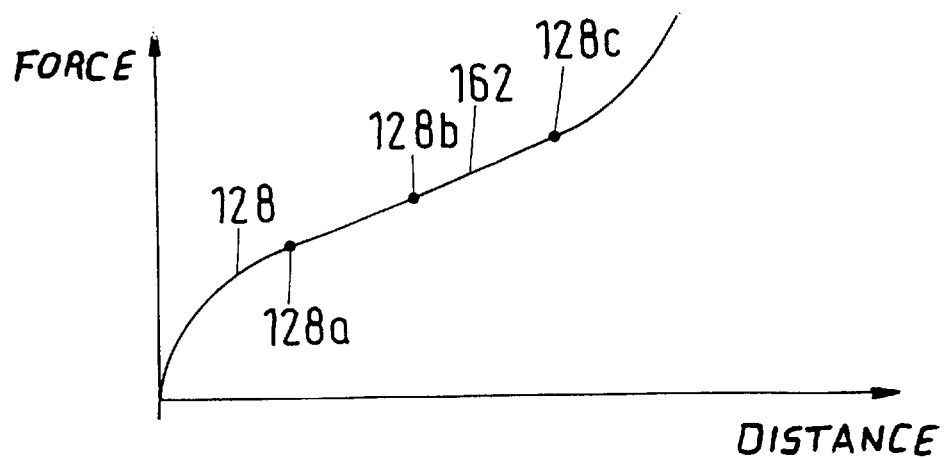
FIG. 13 shows a coordinate system wherein the curve denotes certain characteristics of a diaphragm spring member in the friction clutch of FIGS. 10 and 11.

The force-to-distance coordinate system of FIG. 13 includes a curve 128 which is characteristic of variations of the bias of the energy storing device (diaphragm spring) 159 in the clutch 101 of FIGS. 10 and 11. The curve 128 includes a portion or section 162 which is straight or practically straight. The point 128a on the curve 128 is indicative of that condition of the spring 159 which the latter assumes when the clutch 101 is new and disengaged and includes or cooperates with a clutch disc having intact friction linings. The point 128b denotes that condition of the spring 159 when the tips 104c of the tongues 104b of the diaphragm spring (clutch spring) 104 have been moved axially of the housing 102 (arrow A) through a distance which is required to disengage the clutch 101. When the extent of axial displacement of the tips 104c is changed, the point 128b is shifted along the curve 128, namely toward the point 128c when the extent of axial displacement of the tips 104c increases. The points 128a, 128b migrate toward the point 128c in response to increasing wear upon the friction linings of the clutch disc. The point 128c denotes that condition of the spring 159 when the clutch 101 is fully disengaged and the wear upon the friction linings has risen to a maximum permissible value.

The characteristic curves 128 and 129 of FIGS. 13 and 12 indicate that the axial force exerted by the springs 109, 111 and 159 upon the diaphragm spring 104 increases during each disengagemnt of the friction clutch 101. The resultant of the forces furnished by the springs 109, 111 and 159 increases and acts upon the spring 104 in a direction toward the rear wall of the housing 102. Such resultant force urges the diaphragm spring 104 against the annular seat 134 of the seat assembly 105. This enables the diaphragm spring 104 to change its conicity by performing a tilting or conicity changing movement relative to the fulcrum defined by the seat 134. In other words, the diaphragm spring 104 acts as a two-armed lever.

In order to ensure that the disengaging force remains constant or at least substantially constant during the entire useful life of the clutch 101, it is necessary that the characteristic curves (spring characteristics) of the energy storing devices which urge the diaphragm spring 104 against the annular seat 134 (these devices include the leaf springs 111, the leaf springs 109 (if such springs are being used in the clutch 101) and the diaphragm spring member 159) be related to each other in such a way that, when the pressure plate 103 is disengaged or practically disengaged from the adjacent friction linings of the clutch disc which is used in or with the clutch 101, the sum of forces then furnished by the devices 109, 111 and 159 and acting upon one side of the diaphragm spring 104 is at least substantially neutralized by the sum of forces acting upon the other side of the spring 104. The forces acting upon the other side of the diaphragm spring 104 include the then applied disengaging force (acting upon the tips 104c of the prongs 104b) and the bias of the coil springs 138 which urge the ramps of the seat 134 to slide along the adjacent ramps of the housing 102 in a sense to move the seat 134 and the diaphragm spring 104 away from the rear wall of the housing 102, i.e., toward the pressure plate 103 and the non-illustrated counterpressure plate.

Such selection of the relationships of the just enumerated forces ensures that, during each stage of axial displacement of the seat 134 and diaphragm spring 104 for the purpose of compensating for wear at least upon the friction linings of the clutch disc, the force with which the spring 104 is urged against the seat 134 remains at least substantially unchanged. The aforediscussed equilibrium of forces acting upon the two sides of the diaphragm spring 104 is disturbed in response to the development of initial or additional wear during the useful life of the clutch 101 but is reestablished during disengagement of the clutch in that the wear or additional wear (particularly upon the friction linings) is compensated for by an axial displacement of the spring 104 and seat 134 in a direction toward the pressure plate 103. In other words, the compensation for wear upon certain parts of the clutch 101 is analogous to that described before with reference to the clutch 1 of FIGS. 1 to 6. Reference may be had, too, to the numerous patents and patent applications which are identified in the specification of the present application and also deal with compensation for wear upon the friction linings and preferably also upon certain other parts of friction clutches.

The aforediscussed desirable relationships between various energy storing devices which act upon the diaphragm spring 104, at least during disengagement of the clutch 101, ensure that when the friction linings are fully or practically fully relieved (unstressed), the sum of forces acting upon the diaphragm spring is either constant or fluctuates within an acceptable narrow range during the entire useful life of the friction clutch 101. At the same time, such design of the friction clutch 101 ensures that, when the aforementioned sum of forces acting upon the diaphragm spring 104 departs from the required value or is outside of the permissible range, the magnitude of the force acting upon the diaphragm spring in a sense to urge it against the seat 134 increases in response to progressing disengagement of the clutch. This is desirable for reasons which will be fully explained with reference to FIG. 14; briefly stated, such mode of operation ensures that the likelihood of excessive movement in a direction to disengage the clutch is or can be reduced to a considerable or readily detectable extent.

The coordinate system which is shown in FIG. 14 is analogous to that which is shown in FIG. 9. The curve 147 of FIG. 14 represents the progress of the disengaging force which is to be applied to the tips 104c of prongs 104b forming part of the diaphragm spring 104 and which causes the pressure plate 103 to move axially of the housing 102 and away from the friction linings of the clutch disc. The first stage (indicated at 151) of disengagement of the clutch 101 involves a progress of the disengaging force as indicated by the curve 153.

The extent of movement of the tips 104c of the prongs 104b in a direction as indicated by the arrow A shown in FIG. 10, namely to move the tips 104c toward the pressure plate 103 and to thus fully disengage the clutch 101, is shown in FIG. 14 at 152. The disengaging force (denoted by the curve 147) varies in a manner as indicated by the portion 147a. That stage of disengagement which involves a movement (in mm) through the distance 151 (approximately one-half of the overall distance 152) necessitates the application of a resultant force acting in the direction of the axis X—X and varying in a manner as indicated by the curve 153. Such resultant force is generated by the resilient sectors of the clutch disc (see the sectors 10 in FIG. 2), by the sets of leaf springs 109, 111 and by the diaphragm spring member 159. The point 154 on the curve 147 of FIG. 14 represents that extent of movement of the tips 104c in a direction away from the rear wall of the housing 102 at which the resilient segments of the clutch disc are no longer stressed or are not stressed to any appreciable extent. The point 154 can represent a single distance or a relatively narrow range of distances; the next-following stage of disengagement of the clutch 101 (i.e., a movement of the tips 104c beyond the point or range 154) involves the application (to the spring 104) of a relatively small resultant force furnished by the springs 109, 111 and 159.

The progress of the just mentioned resultant force (during movement of the tips 104c beyond the point or range 154) is denoted by the straight and slightly sloping section 155 of the characteristic curve. It will be seen that such resultant force is relatively constant and relatively small, as long as it suffices to ensure that the diaphragm spring 104 continues to contact the seat 134. Reference may also be had to the preceding dscription of FIGS. 12 and 13. The dot-dash line 153a in the system of FIG. 14 represents the resultant force which is generated by the springs 109, 111 and 159 during the initial stage 151 of disengagement of the clutch 101. The line 153a is a straight line and its slope is identical with or similar to that of the section 155. However, it is equally possible to select the characteristics and the mode of cooperation of the springs 109, 111, 159 (i.e., of the characteristic curve 153a, 155 denoting the resultant force furnished by these springs) in such a way that the portion 153a and/or the portion 155 exhibits a slight curvature, e.g., a curvature denoting a progressing change of the resultant force. The same result can be achieved by leaving the characteristics of the springs 109, 111 and 159 unchanged and by employing one or more additional springs which cooperate with the springs 109, 111 and 159 to generate a resultant force having a progress which deviates from that shown at 153a and 155. The additional spring or springs can constitute coil springs, leaf springs and/or other energy storing elements.

When the extent of disengagement of the clutch 101 exceeds that denoted by the point 154 in the system of FIG. 14, the progress of the disengaging force acting upon the tips 104c of the prongs 104b corresponds to that denoted by the portion 147b of the curve 147. Thus, the disengaging force which must be applied during such stage of disengagement of the clutch 101 decreases to a point 156, i.e., it is less than at the point 154.

In heretofore known friction clutches which are provided with means to compensate for wear at least upon the friction linings of the clutch disc, and wherein the wear compensating means is set up to act between the rear wall of the housing and the clutch spring (normally a diaphragm spring), the energy storing means which act upon (prop) the diaphragm spring are designed and their mode of cooperation selected in such a way that the resultant axial force which is generated by the energy storing means is at least substantially constant during each stage of disengagement of the clutch or that the magnitude of such resultant axial force decreases. Consequently, in such friction clutches the extent of movement in a direction to release the clutch is ensured only to a point corresponding to the point 156 on the section 147b of the curve 147 shown in FIG. 14. On the other hand, the aforedescribed novel relationship between the various forces (as indicated by the curve 155 in the coordinate system of FIG. 14) ensures that the reliability of preventing the undesirable extension of movement in a direction to disengage the clutch is much more satisfactory, namely all the way to the point 163. Such lengthening or increase of reliability of preventing undesirable movements during disengagement of the clutch ensures that no undesirable "compensation" for wear can take place even if the manufacturing tolerances involving various parts of the clutch are quite pronounced. Such parts of the clutch include (primarily or exclusively) the clutch release means, e.g., the aforementioned release bearing and/or the parts which are provided to move the release bearing against the tips 104c of the prongs 104b and/or in the opposite direction (away from the clutch disc). Otherwise stated, the likelihood that the improved clutch 101 would permit undesirable "compensations" for (non-existent or insufficient) wear during disengagement of such clutch is much less pronounced than in heretofore known clutches which are equipped with wear compensating means.

Another advantage of the just discussed reliabile prevention of undesirable movements during disengagement of the clutch 101 is that it provides a greater freedom in selection of the characteristic curve of the diaphragm spring 104.

It is clear that the improved friction clutch need not employ only those energy storing means (such as the springs 109, 111 and 159) which were described with reference to FIGS. 1–6 and 10–11. Thus, the desirable progressive variations of forces and/or resultant forces can be achieved with equal advantage by resorting to resilient elements which need not be coil springs, leaf springs and/or diaphragm springs or which constitute coil springs, leaf springs and/or diaphragm springs and are utilized in addition to or in lieu of at least some of the described and illustrated springs. For example, FIG. 11 illustrates an annular washer-like spring 163a which surrounds the shank of the rivet 116, which reacts against the marginal portion of the housing 102, and which bears upon the head 116a of the rivet 116. If the clutch 101 employs one or more springs 163a, it might be necessary to alter the design of the marginal portion of the housing 102 in order to provide room for such spring or springs.

It is also possible to replace the leaf springs 111 with leaf springs of the type having one end portion affixed to the housing 102 and the other end portion affixed to the pressure plate 103, i.e., to omit nearly one-half of the spring 111 which is shown in FIG. 11. Such modified springs 111 can be assembled into two groups, namely a first group wherein one end portion is affixed to the housing 102 and the other end portion is affixed to the pressure plate 103, and a second group wherein the one end portion of each modified spring 111 is affixed to the plate 103 and the other end portion is secured to the housing. The springs of one group act to pull the pressure plate 103 toward the housing 102, and the springs of the other group act to push the pressure plate axially of and away from the housing.

Furthermore, the lengths of the just described modified springs (which can be utilized in lieu of (or even in addition to) the leaf springs 111 can be selected with a view to permit a buckling or similar deformation of the median portion of each modified spring (e.g., in a manner as shown in FIG. 3 or 11 but without a connection between the median portion of the modified spring on the one hand, and the housing 102 or pressure plate 103 on the other hand). Each of the just described modified leaf springs would correspond to approximately one-half of the leaf spring 111 which is shown in FIG. 11. One end portion of each such leaf spring would be affixed to the housing 102 by one of the two rivets 114 shown in FIG. 11, and the other end portion of each of the two springs would be secured to the pressure plate 103 by the illustrated rivet 116. Those end portions of the two leaf springs replacing the leaf spring 111 of FIG. 11 which would be secured to the pressure plate 103 by a common rivet 116 could overlie each other. However, it might be desirable to provide for each modified spring a separate connection (such as a discrete rivet 116) which secures it to the pressure plate 103; this renders it possible to distribute the modified leaf springs circumferentially of the pressure plate 102 in such a way that the neighboring springs need not overlie but can be spaced apart from each other.

In accordance with another modification, a friction clutch (such as the clutch 101) wherein the wear compensating means is installed between the rear wall of the housing 102 and the diaphragm spring 104 can be provided with resilient means adapted to be effective in a sense to urge the pressure plate 103 toward the housing 102, i.e., in a direction to disengage the clutch. Such resilient means is constructed and installed in such a way that it urges the pressure plate 103 axially of the housing and away from the clutch disc and counterpressure plate all the way to the fully retracted position not only while the friction linings of the clutch disc are new or practically unused but also when the axial movement of the pressure plate to its fully retracted position is longer because of minor or major wear upon the friction linings. In other words, the aforementioned resilient means ensures that the pressure plate 103 is being acted upon by an at least substantially unchanging disengaging force during the entire useful life of the friction clutch. Referring again to FIG. 7, this would mean that the section 31 of the (characteristic) curve 29 (of the set of leaf springs 11) would be at least substantially horizontal.

The just described modification is particularly useful in friction clutches of the type shown in FIGS. 10 and 11, namely wherein an additional energy storing device (159) which acts upon the diaphragm spring 104 at a radial distance from the axis X—X that matches or approximates the radial distance of the annular seat 134 is not deformed at all or undergoes negligible deformation during actuation of the friction clutch. This is in contrast to the mounting of the spring 159. A spring which acts upon the diaphragm spring 104 at the same radial distance from the axis X—X as the annular seat 134 can be readily designed and installed to ensure that it applies to the spring 104 a constant or practically constant force during those stages of axial movement of the pressure plate which are necessary in view of progressing wear upon the friction linings.

Figure 15:
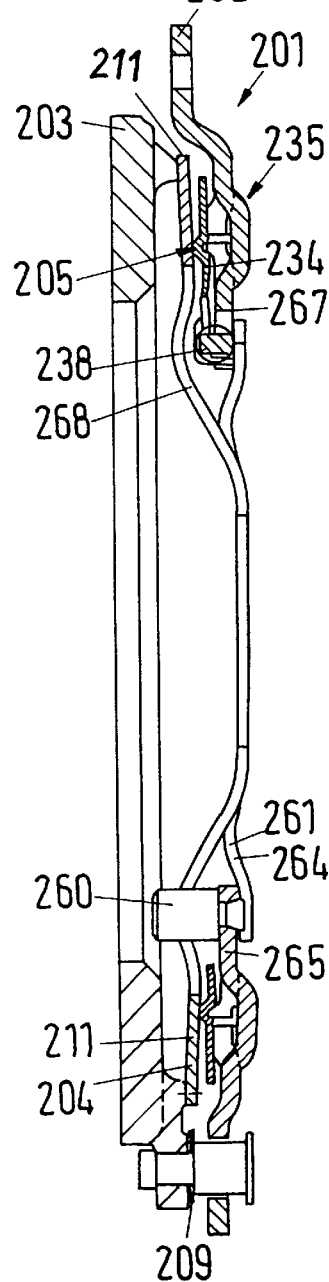
FIG. 15 is an axial sectional view of a further friction clutch.

The friction clutch 201 which is shown in FIG. 15 comprises a housing or cover 202 which is or which can be made of a metallic sheet material and which transmits torque to a coaxial pressure plate 203. The latter has limited freedom of axial movement relative to the housing 202 in directions toward and away from the friction linings of a clutch disc (not shown). A clutch spring 204 (preferably a diaphragm spring) is installed between the rear wall of the housing 202 and the pressure plate 203, and this spring is tiltable relative to an annular fulcrum defined by a seat assembly 205 carried by the housing 202. The spring 204 can act as a two-armed lever, the same as the diaphragm spring 4 or 104.

The circumferentially complete radially outer or main portion 211 of the diaphragm spring 204 can act upon a circumferentially complete annular projection or against an annulus of projections provided on the adjacent portion of the pressure plate 203. Leaf springs 209 extend circumferentially or tangentially of the marginal portion of the housing 202 and are affixed to the housing as well as to the pressure plate 203, preferably in such a way that they tend to move the pressure plate 203 axially and toward the rear wall of the housing, i.e., these leaf springs oppose the bias of the diaphragm spring 204. The leaf springs 209 further serve to transmit torque between the housing 202 and the pressure plate 203.

The friction clutch 201 further comprises a counterpressure plate (reaction plate) which corresponds to the counterpressure plate 6 of FIG. 2 and can receive torque from a prime mover, e.g., from the rotary output element of an internal combustion engine in the power train of a motor vehicle. The seat assembly 205 comprises a ring-shaped corrugation 234 which constitutes an annular seat for the diaphragm spring 204 and forms part of or is affixed to the housing 202. The annular seat 234 forms part of an automatic wear compensating unit 235 serving to carry out necessary adjustments in order to compensate for wear, at least upon the friction linings of the clutch disc, namely to shift (when necessary) the diaphragm spring 204 axially toward the counterpressure plate.

The annular seat 234 is clamped between the housing 202 and the diaphragm spring 204, at least in the engaged condition of the friction clutch 201. This seat has a circumferentially extending set of ramps which cooperate with complementary ramps at the inner side of the rear wall of the housing 202. The two sets of ramps cause the diaphragm spring 204 to move (when necessary to compensate for wear) in a direction away from the rear wall of the housing 202 (during disengagement of the clutch 201) as well as to ensure that no clearance can develop between the seat 234 and the diaphragm spring 204. The character 238 denotes one of the coil springs which form part of the wear compensating means 235 and tend to turn the seat 234 relative to the housing 202 when the axial bias upon the spring 204 permits an angular displacement of the seat 234 relative to the housing 202.

The mode of operation of the wear compensating means 235 between the housing 202 and the diaphragm spring 204 is analogous to that of the compensating means 35 in the clutch 1 of FIGS. 1 to 6. Thus, the function of the seat 234 is analogous to that of the seat 34, and the function of the coil springs 238 (of which only one can be seen in FIG. 15) is analogous to that of the three coil springs 38 shown in FIG. 1.

The means for preventing rotation of the housing 202 and the diaphragm spring 204 relative to each other comprises a set of rivets or bolts 260 which are anchored in the housing and extend through suitably configured openings in the diaphragm spring.

An important difference between the friction clutches 1, 101 and 201 is that the discrete biasing means for the diaphragm springs 4 and 104 are replaced by axially yieldable resilient means 261 for biasing the diahragm spring 204 and forming part of (by being of one piece with) the spring 204. The biasing means 261 of and for the diaphragm spring 204 replaces the biasing means 159 in the friction clutch 101 of FIGS. 10 and 11 as well as the corresponding biasing means in the friction clutch 1 of FIGS. 1 to 6.

As can be seen in FIG. 15, the biasing means 261 bears upon a portion 265 of the housing 202 and preferably comprises an annulus of tongues, lugs or analogous projections 264 (see also FIG. 16) which urge the circumferentially complete radially outer main portion 211 of the diaphragm spring axially of and toward the rear wall of the housing 202. More specifically, the projections 264 actually pull the main portion 211 of the diaphragm spring 204 toward the rear wall of the housing 202; this enables the diaphragm spring to urge the ramps of the annular seat 234 against the complementary ramps at ther inner side of the rear wall of the housing.

Figure 16:
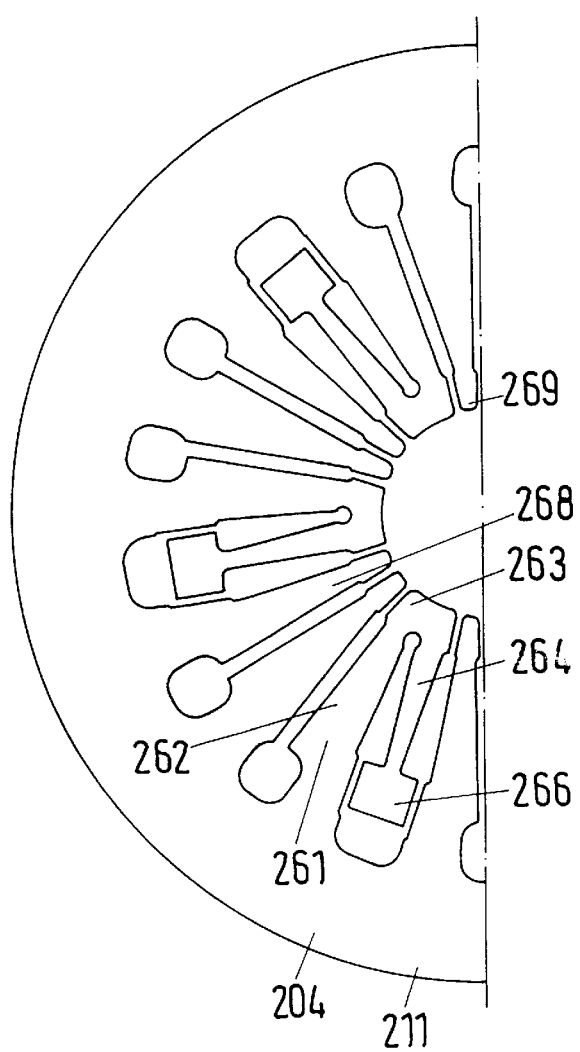
FIG. 16 is a fragmentary plan view of a clutch spring in the friction clutch of FIG. 15.

FIG. 16 shows that the main portion 211 of the diaphragm spring 204 carries a set of radially inwardly extending tongues or prongs 268 forming part of the clutch disengaging means; to this end, the radially innermost portions or tips 269 of the tongues 268 can be engaged and depressed by a release bearing (not shown) adapted to be acted upon by a requisite clutch disengaging force furnished by a suitable actuator (not shown in FIGS. 15 and 16). The aforementioned projections 264 are elongated and resemble hairpins of one piece with certain tongues of the diaphragm spring 204. Each projection comprises a radially extending portion 262 which is located between two standard tongues 268 and extends radially inwardly from the main portion 211. The radially inner portion 263 of the portion 262 establishes connection with a tongue which extends radially outwardly and has an enlarged free end 266 close to but still spaced apart from the radially innermost region of the main portion 211.

An advantage of the just described design of the projections 264 is that they provide a relatively long bending or torsinal deformation zone between the radially outermost part of the radially extending portion 262 and the free end 266 which abuts the adjacent portion 267 of the housing 202. The provision of an enlarged free end 266 exhibits the advantage that the pressure upon each unit area of any free end 266 and of the adjacent end portion 267 of the housing 202 is relatively low due to the large-area contact between such parts. The configuration and mounting of each projection 264 are such that the enlarged end portions 266 bear upon the adjacent end portions 267 of the housing 202. As can be seen in FIG. 15, the enlarged end portions 266 bear upon the exposed (outer) side of the rear wall of the housing 202 so that the main portion 211 of the diaphragm spring 204 is pulled against the adjacent side of the annular seat 234.

The initial stressing of the projections 264 can be selected within a wide range to thus ensure an otimal engagement between the diaphragm spring 204 and the seat 234. It is often desirable to impart to the enlarged end portions 266 and/or to the portions 267 of the housing 202 a spherical (convex) shape in order to optimize the movability (tiltability) of the diaphragm spring at the fulcrum defined by the annular seat 234. It is clear that the mounting of the diaphragm spring 204 and its resilient means 261 must or should be selected by full consideration of the existing kinematics and of the required relative movements between the spring 204 and the housing 202.

The characteristics of the resilient means 261 of the diaphragm spring 204 preferably match or approximate those denoted by the portion or section 162 of the characteristic curve 128 of the resilient means 159 in the friction clutch 101 of FIGS. 10 and 11. The characteristics of the leaf springs 209 can match or at least approximate those denoted by the curve 129 in the coordinate system of FIG. 12.

The novel arrangement of various resilient means acting upon the diaphragm spring (such as 4, 104 or 204) during various stages of operation of the friction clutch can be resorted to in conjunction with automatic wear compensating means of the type disclosed in U.S. Pat. No. 5,628,389 granted May 13, 1997 and corresponding to published German patent application Ser. No. 195 24 287. One of numerous advantages of such combination is that the diaphragm spring cannot turn relative to the housing of the clutch even if the output element of the prime mover which drives the counterpressure plate of the clutch (such as the camshaft or a crankshaft of the internal combustion engine in the power train of a motor vehicle) undergoes an abrupt and very pronounced acceleration.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of friction clutches and, therefore, such adaptations should and are intended to be comprehended within the meaning and range of equivalence of the appended claims.

What is claimed is:

1. An engageable and disengageable friction clutch for use in a power train, comprising
   a housing rotatable about a predetermined axis;
   a pressure plate rotatable with and having a limited freedom of axial movement relative to said housing to thus effect an engagement or disengagement of the clutch;
   at least one diaphragm spring operating between said housing and said pressure plate and assuming, at least in the engaged state of the clutch, a predetermined stress condition which tends to vary in response to repeated engagement and disengagement and the resulting wear upon the clutch and in which the at least one diaphragm spring urges the pressure plate axially away from the housing;
   means for compensating for said wear, including means for maintaining said at least one diaphragm spring at least close to said predetermined condition during an extended period of use of the clutch; and
   means for promoting disengagement of the clutch, including energy storing resilient means for biasing said pressure plate toward said housing during disengagement of the clutch with a force which varies at least during disengagement of the clutch, said force having a progressive character at least during disengagement of the clutch.

2. The clutch of claim 1, wherein said extended period at least approximates the useful life of the clutch in the power train.

3. The clutch of claim 1, wherein said wear during said extended period entails a displacement of said pressure plate axially of and relative to said housing with an attendant change in the amount of energy being stored by said resilient means.

4. The clutch of claim 3, wherein said change in the amount of energy being stored by said resilient means is a degressive change.

5. The clutch of claim 1, further comprising a counterpressure plate coaxial and rotatable with said housing, and a clutch disc disposed between and receiving torque from said plates in the engaged condition of the clutch.

6. The clutch of claim 5, wherein said counterpressure plate comprises a flywheel.

7. The clutch of claim 1, wherein said resilient means comprises at least one leaf spring.

8. The clutch of claim 7, wherein said at least one leaf spring is elongated and has a predetermined undulate shape, said means for promoting further comprising means for securing spaced-apart first and second portions of said at least one leaf spring to said housing and to said pressure plate, respectively, to thus maintain said at least one leaf spring in a stressed condition as seen axially of said housing and longitudinally of said at least one leaf spring.

9. The clutch of claim 8, wherein said at least one leaf spring is maintained in said stressed condition due to said predetermined undulate shape while the clutch is installed in the power train.

10. The clutch of claim 9, wherein said at least one leaf spring is buckled transversely of the elongation thereof while the clutch is in the power train.

11. The clutch of claim 1, wherein said wear entails a displacement of said pressure plate axially of and relative to said housing, and said force varies during said displacement as well as during said axial movement of said pressure plate relative to said housing.

12. The clutch of claim 1, wherein said pressure plate has an at least substantially circular shape and said resilient means comprises at least one leaf spring extending at least substantially tangentially of said pressure plate.

13. The clutch of claim 1, wherein said pressure plate has an at least substantially circular shape and said resilient means comprises at least one leaf spring extending at least substantially circumferentially of said pressure plate.

14. The clutch of claim 1, wherein said resilient means comprises at least one elongated leaf spring having a first part including two end portions and a second part including a median portion, said means for promoting further comprising means for connecting one of said parts to said housing and means for connecting the other of said parts to said pressure plate.

15. The clutch of claim 1, wherein said compensating means is operative between said housing and said diaphragm spring.

16. The clutch of claim 1, wherein said diaphragm spring is tiltable relative to said housing and further comprising means for biasing said diaphragm spring in the direction of said axis.

17. The clutch of claim 16, further comprising first and second seats provided in said housing, said diaphragm spring being tiltable between said seats and being tiltable relative to one of said seats during disengagement of the clutch, and further comprising means for biasing said one seat against said diaphragm spring.

18. The clutch of claim 17, wherein said one seat is movable in the direction of said axis.

19. The clutch of claim 17, wherein said means for biasing said one seat against said diaphragm spring operates in parallel with said energy storing resilient means.

20. The clutch of claim 17, further comprising a counterpressure plate coaxial and rotatable with said housing, and a clutch disc having friction linings which are subject to said wear as a result of said repeated engagement and disengagement of the clutch, said clutch being disengageable in response to the application of a disengaging force which increases in response to increasing wear upon said friction linings and which effects an at least slight movement of said one seat at least during a portion of disengagement of the clutch.

21. The clutch of claim 20, wherein said one seat is movable in the direction of said axis and said diaphragm spring is tiltable relative to said seats in response to the application of a force which increases during movement of said one seat in the direction of said axis.

22. The clutch of claim 18, wherein said compensating means comprises means for moving said one seat axially of said housing until the forces being exerted upon said diaphragm spring neutralize each other.

23. The clutch of claim 17, wherein said means for biasing said one seat against said diaphragm spring includes an energy storing device arranged to apply to said one seat an at least substantially constant force within said extended period of repeated engagement and disengagement of the clutch.

24. The clutch of claim 17, wherein said means for biasing said one seat comprises at least one diaphragm spring member.

25. The clutch of claim 17, wherein said means for biasing said one seat comprises at least one bias transmitting component between said at least one diaphragm spring member and said one seat.

26. The clutch of claim 17, wherein said compensating means comprises means for moving said one seat axially of said housing until the forces being exerted upon said diaphragm spring neutralize each other.

27. The clutch of claim 1, wherein said diaphragm spring is pivotable relative to said housing and further comprising a counterpressure plate rotatable with said housing, a clutch disc having friction linings disposed between said plates and being subject to wear in response to said repeated engagement and disengagement of the clutch, and a fulcrum provided on said housing, said fulcrum being movable in the direction of said axis and said diaphragm spring being arranged to pivot relative to said fulcrum at least during engagement of the clutch, said compensating means comprising means for moving said fulcrum axially of said housing to an extent which is dependent upon the extent of wear upon said friction linings.

28. The clutch of claim 1, further comprising at least one leaf spring operating between said housing and said pressure plate and arranged to bias said pressure plate in parallel with said energy storing resilient means in a direction to disengage the clutch.

29. The clutch of claim 28, wherein said at least one leaf spring has a degressive characteristic at least during disengagement of the clutch.

30. The clutch of claim 28, further comprising means for fixedly securing said at least one leaf spring to at least one of said housing and said pressure plate.

31. The clutch of claim 28, wherein said at least one leaf spring is arranged to transmit at least some torque between said housing at said pressure plate.

32. The clutch of claim 28, wherein the bias of said at least one leaf spring upon said pressure plate increases in response to said wear and the resulting axial movement of said pressure plate away from said housing.

33. The clutch of claim 28, wherein said pressure plate is arranged to move axially and away from said housing in response to said wear upon the clutch and said at least one leaf spring and said energy storing resilient means jointly establish a force differential which is at least substantially constant and urges said pressure plate axially toward said housing.

34. The clutch of claim 28, wherein said pressure plate is arranged to move axially and away from said housing in response to said wear upon the clutch and said at least one leaf spring and said energy storing resilient means jointly establish a slightly increasing force differential which urges said pressure plate axially of and away from said housing.

35. The clutch of claim 34, wherein said force differential increases within a range of between about 5% and 25%.

36. The clutch of claim 1, further comprising an annular seat tiltably mounting said at least one diaphragm spring on said housing at least in the engaged condition of the clutch, a counterpressure plate rotatable with said housing, and a clutch disc having friction linings disposed between said plates and being subject to wear in response to said repeated engagement and disengagement of the clutch, said energy storing resilient means comprising at least one first additional spring arranged to transmit torque between said housing and said pressure plate and at least one second additional spring arranged to bias said pressure plate away from said housing, said first and second additional springs being arranged to generate and to apply to said pressure plate a resultant force which opposes the force of said at least one diaphragm spring during disengagement of the clutch and during the resultant axial movement of said pressure plate away from said friction linings and which at least closely approximates a disengaging force acting upon said at least one diaphragm spring subsequent to at least partial separation of said pressure plate from said friction linings.

37. The clutch of claim 36, wherein said clutch disc comprises first and second friction linings respectively adjacent said pressure plate and said counterpressure plate, said energy storing resilient means further comprising at least one third additional spring arranged to urge said first and second friction linings axially of said housing and away from each other, said resultant force being generated by said first and second additional springs jointly with said third additional spring.

38. The clutch of claim 36, wherein said first additional spring comprises at least one leaf spring.

39. The clutch of claim 1, further comprising a counterpressure plate rotatable with said housing, a clutch disc having friction linings disposed between and being engaged by said plates in the engaged condition of the clutch, and means for applying to the clutch a disengaging force including means for moving said pressure plate axially of and away from said counterpressure plate and for thus disengaging said pressure plate from said friction linings, said energy storing resilient means comprising a first additional spring operating between said housing and said pressure plate and a second additional spring arranged to transmit torque between said housing and said pressure plate, said additional springs being arranged to directly generate a resultant force which at least approximates said disengaging force at least while said pressure plate is out of contact with said friction linings.

* * * * *

UNITED STATES PATENT AND TRADEMARK OFFICE
CERTIFICATE OF CORRECTION

PATENT NO. : 6,085,882
DATED : July 11, 2000
INVENTOR(S) : Karl-Ludwig KIMMIG et al.

It is certified that error appears in the above-identified patent and that said Letters Patent is hereby corrected as shown below:

- - Luk Lamellen und Kupplungsbau GmbH, Buhl/Baden, Germany. - -

Signed and Sealed this

Tenth Day of April, 2001

Attest:

NICHOLAS P. GODICI

Attesting Officer

Acting Director of the United States Patent and Trademark Office